US011956158B2

(12) United States Patent
McIntosh

(10) Patent No.: US 11,956,158 B2
(45) Date of Patent: Apr. 9, 2024

(54) CONTENT SHAPING AND ROUTING IN A NETWORK

(71) Applicant: SKY PEAK TECHNOLOGIES, INC., Grand Junction, CO (US)

(72) Inventor: Don Leslie Gilleland McIntosh, Grand Junction, CO (US)

(*) Notice: Subject to any disclaimer, the term of this patent is extended or adjusted under 35 U.S.C. 154(b) by 43 days.

(21) Appl. No.: 17/633,765

(22) PCT Filed: Jun. 8, 2021

(86) PCT No.: PCT/US2021/036493
§ 371 (c)(1),
(2) Date: Feb. 8, 2022

(87) PCT Pub. No.: WO2021/252548
PCT Pub. Date: Dec. 16, 2021

(65) Prior Publication Data
US 2022/0294741 A1 Sep. 15, 2022

Related U.S. Application Data

(60) Provisional application No. 63/036,235, filed on Jun. 8, 2020.

(51) Int. Cl.
*H04L 47/25* (2022.01)
*H04L 47/122* (2022.01)
*H04L 47/2475* (2022.01)

(52) U.S. Cl.
CPC ............ *H04L 47/25* (2013.01); *H04L 47/122* (2013.01); *H04L 47/2475* (2013.01)

(58) Field of Classification Search
CPC ... H04L 47/25; H04L 47/122; H04L 47/2475; H04L 67/62; H04L 69/24; H04L 67/06;
(Continued)

(56) References Cited

U.S. PATENT DOCUMENTS 6,944,221 B1    9/2005 Keesman
2005/0259613 A1*  11/2005 Garudadri ............. H04L 69/161
                                                        375/E7.134
(Continued)

OTHER PUBLICATIONS

PCT/US2021/36493—International Search Report and Written Opinion, dated Sep. 9, 2021, 8 pages.

*Primary Examiner* — Kiet Tang
(74) *Attorney, Agent, or Firm* — Vernon W. Francissen

(57) ABSTRACT

Technologies are shown for content data transmission bandwidth management involving receiving content data for a mobile device, transmitting the content data at an initial bit rate, and introducing a delay in the communication channel to activate an adaptive bit rate (ABR) capability in the mobile device. The technologies can include receiving feedback pertaining to content data consumption in the mobile device and adjusting the delay in the communication channel to increase or decrease the bit rate of the ABR capability responsive to the feedback. The technologies can include determining an initial resolution of the content data during a trial period during transmitting content data to the mobile device and adjusting the delay in the communication channel to increase or decrease the bit rate of the ABR capability in the mobile device to a target bit rate.

20 Claims, 13 Drawing Sheets

(58) Field of Classification Search
CPC .. H04N 19/115; H04N 19/156; H04N 19/164; H04N 19/177
See application file for complete search history.

(56) References Cited

U.S. PATENT DOCUMENTS

| | | |
|---|---|---|
| 2012/0203886 A1 | 8/2012 | Mavromatis |
| 2012/0290739 A1 | 11/2012 | Melnyk et al. |
| 2015/0271700 A1* | 9/2015 | Lee ................... H04W 28/0263 370/230 |
| 2015/0312301 A1* | 10/2015 | Dasher ................. H04L 1/0014 709/217 |
| 2015/0381690 A1* | 12/2015 | Schmidt ............. H04N 21/2343 709/231 |

* cited by examiner

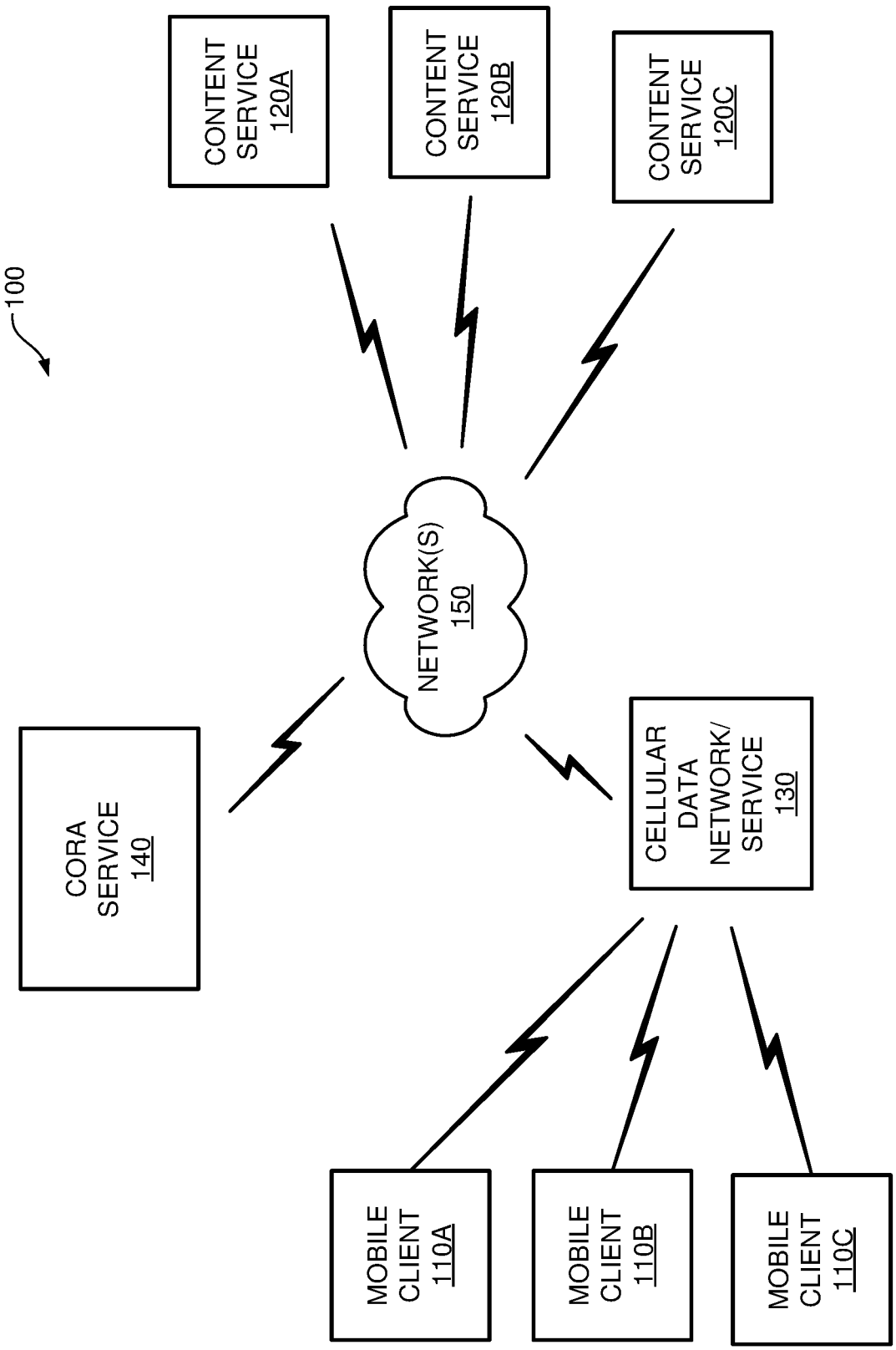

CONTENT SHAPING AND ROUTING IN A NETWORK

CROSS REFERENCE TO RELATED APPLICATIONS

This application is a 371 of International Application No. PCT/US2021/36493, filed Jun. 8, 2021, which claims the benefit of U.S. Provisional Patent Application No. 63/036,235 for "Content Shaping and Routing In a Network" filed Jun. 8, 2020, herein incorporated by reference in its entirety for all purposes.

BACKGROUND

In current telecommunication systems, it is common to stream content, such as digital video, audio or other digital content, from services, such as internet based subscription-based streaming services, to remote consuming devices, such as personal computers, tablets and smart phones.

The streaming of content often consumes a large amount of bandwidth in data networks, which can be expensive and may require additional infrastructure build-out for a data networking service provider, such as a cellular data network (CDN) service provider. If a communication channel is unable to support the streaming content, then users may have a degraded user experience (UX) with their devices. For example, a wireless communication channel can be a bottleneck for communication that restricts the amount of content that can be transferred for the wireless channel.

Whereas network operators and owners manage bandwidth using network management tools that affect all devices on the network that has led to legal challenges. The build-out of infrastructure requires time and investment.

It is with respect to these and other considerations that the disclosure made herein is presented.

SUMMARY

Disclosed are methods, systems and computer readable media for content data transmission bandwidth management. In general terms, the disclosed technology supports content shaping and routing processes for delivering content service to mobile or remote devices in networks that may have one or more segments with relatively low bandwidth capacity, e.g. regardless of wireless technology. A system architecture of the disclosed technology can have two components: 1) a service stack, which can operate on a server cluster or on a cloud-based infrastructure and 2) a mobile application running in the background on a mobile or remote device. The system can provide multiple methods for decreasing data consumed for content transmission, such as text, images, binary and executable files, and streaming video or audio content.

Examples of content data transmission bandwidth management in accordance with the disclosed technology can involve receiving content data directed toward a mobile device, transmitting the content data in a communication channel to the mobile device at an initial bit rate, and introducing a delay in the communication channel to activate an adaptive bit rate (ABR) capability in the mobile device.

Certain examples can include receiving feedback pertaining to a status of content data consumption in the mobile device from a mobile client application on the mobile device and adjusting the delay in the communication channel to increase or decrease the bit rate of the ABR capability in the mobile device responsive to the feedback. Some examples can include determining an initial resolution of the content data during a trial period during the transmitting the content data to the mobile device at the initial bit rate and adjusting the delay in the communication channel to increase or decrease the bit rate of the ABR capability in the mobile device to a target bit rate.

Still other examples can include determining one or more bandwidth reduction strategies for processing the content data, processing the content data according to the one or more determined bandwidth reduction strategies and transmitting the processed content data to the mobile device at an initial bit rate. In some of these examples, the bandwidth reduction strategies for processing the content data can include lossy resolution reduction, lossless resolution reduction, lossy transcoding, lossless transcoding, lossy compression and lossless compression. In certain of these examples, the bandwidth reduction strategies are determined based on characteristics of the mobile device.

BRIEF DESCRIPTION OF THE DRAWINGS

Various embodiments in accordance with the present disclosure will be described with reference to the drawings, in which:

FIG. 1A is a simplified architecture diagram that illustrates one example of a communications system suitable for implementations in accordance with certain aspects of the disclosed technology;

DETAILED DESCRIPTION

Figure 1B:
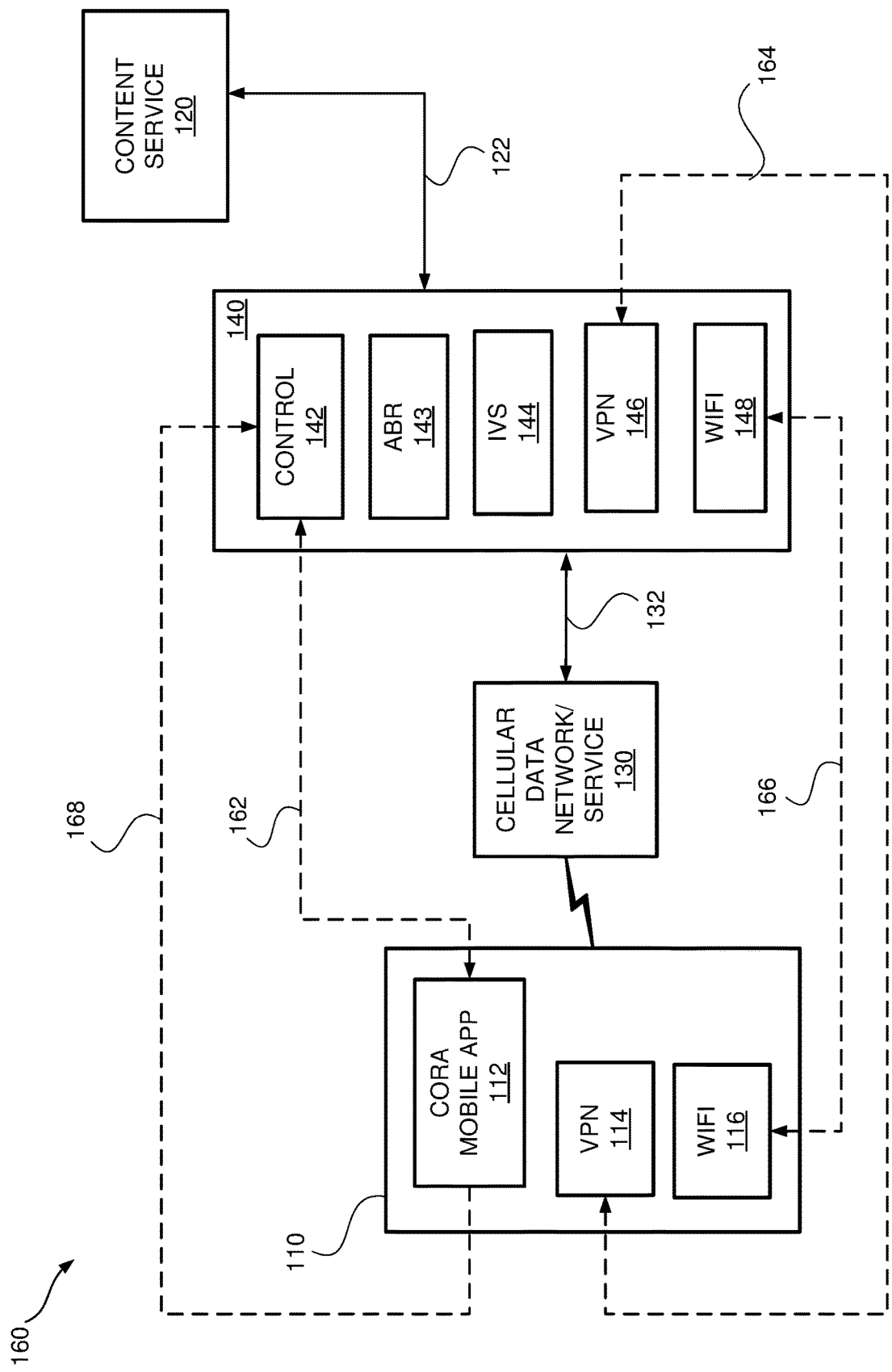
FIG. 1B is a functional block diagram that illustrates one example of a communications architecture according to certain aspects of the disclosed technology.

The subject matter of embodiments of the present invention is described here with specificity to meet statutory requirements, but this description is not necessarily intended to limit the scope of the claims. The claimed subject matter may be embodied in other ways, may include different elements and may be used in conjunction with other existing or future technologies. This description should not be interpreted as implying any particular arrangement or configuration of the elements except when the arrangement or configuration is explicitly described.

Conventionally, network operators and owners manage bandwidth using network management tools that affect all devices on the network, which has often led to customer dissatisfaction with the resulting service level. In contrast, the disclosed technology can operate on content data for particular mobile client devices at the application and presentation layers of the OSI model. A technical advantage of this approach is that it can allow the disclosed technology to manage the data requirements of an individual user device or, in some examples, an individual application on the device.

Furthermore, content services providing content to mobile devices through mobile communication networks, e.g. cellular data networks or services, often encounter a last mile problem when communicating with mobile devices, wherein the mobile devices can experience bandwidth limitations that can impact the quality of content received from content services. The last mile problem can be particularly acute in regions with inadequate communication networks for the volume of communication traffic demanded from the networks. One technical advantage of the disclosed technology can be to reduce bandwidth requirements and data consumed over cellular networks while delivering comparable quality user experience, such as through application of the content shaping techniques of the disclosed technology to reduce bandwidth requirements.

Another conventional solution utilizes proxy servers for processing the application layer and rendering presentation for screen scraping prior to transmission. This screen-scraping approach typically demands that the user adopt a proprietary browser-like application through which all content is consumed, which can result in user objection and, consequently, low adoption rates. Note that this conventional screen scraping approach typically provides no feedback from an end user's mobile or remote device to indicate how the system is performing or whether content is being successfully delivered.

Generally, a technical advantage of certain examples of the disclosed Content Optimization and Routing Architecture (CORA) technology is that it can reduce bandwidth requirements and data consumed over cellular networks while delivering a comparable user experience through content shaping techniques. The CORA technology can, in various examples, employ a number of content shaping strategies including lossy or lossless transcoding, lossy or lossless file compression and decoding, and video shaping. The CORA technology may accomplish this and other technical advantages in particular examples by shaping the content of various forms of data including text, images, video, binary files and other data types to reduce bandwidth demands for the data resulting in less data consumed for delivering the content with little or no impact on the user experience of the user of a mobile device. Another routing strategy in certain examples of the disclosed CORA technology can be to augment cellular data by utilizing available Wi-Fi connections.

Another technical advantage of certain examples of the disclosed technology, in contrast to the conventional solutions, is that it generally does not generally require user behavior change because it uses a CORA mobile application, which can be installed on the end user's client device and can run as a background application that coordinates content shaping with the CORA service stack of the disclosed technology. In some examples, the disclosed technology can perform content shaping with a CORA mobile application deployed in an end user's client device that can provide feedback data to the CORA service for reconfiguring the content shaping based on the status of content consumption or playback in the mobile device, e.g. determining a best-fit data stream for the user's client device while the device is in service.

Least-cost optimization can be another strategy utilized in some examples of the disclosed technology that may evaluate and re-appropriate consumer or wholesale data plans to reduce the need for increased cellular data network infrastructure with little to no impact on user service experience.

The CORA service generally focuses on managing content data at the application and presentation layers of the Open Systems Interconnection (OSI) model. In some examples, this approach may allow the CORA service to manage data requirements down to an individual user device or an application on the device.

Security related to content providers locking down applications using signed certificates can represent a challenge. In some examples, the CORA service can utilize trusted certificates for the decryption of content data while also routing content by application and shaping the content for transmission that limits impact on a user's experience and reduces data transmission costs.

The CORA service or stack is where content shaping processing can occur, in certain examples, with the CORA mobile client application acting as feedback for optimization. The CORA service can be adapted in some examples to run on a variety of topologies including cloud-based servers or services, remote and on-premises servers, and routers.

The disclosed CORA service can, in certain examples, utilize a mobile client application loaded on an end user's device to coordinate these content shaping strategies to improve the user experience depending on the health and operating mode of the cellular network. Cellular network health can be dependent on weather, user concentration and network congestion, and condition of the network gear. Cellular operating mode can be affected by the network operator, such as the management and control of resources at the network and transport layers, hardware and software.

The CORA service can use a virtual private network (VPN) in some examples to securely connect each end user mobile device to the CORA service. In some examples, the CORA mobile client application can be utilized to install a certificate and configure a VPN on a mobile device and downloads a java script containing CORA content routing parameters. In certain examples, web services are utilized to download CORA content routing parameters. The CORA mobile client application can be downloaded by the user in response to an SMS link sent to the device during a service activation process, or pre-configured by a service provider.

Utilizing content routing parameters configured in a CORA mobile client application installed on an end user's mobile device and a number of content shaping strategies running on the CORA service, in some examples, CORA may improve the efficiency and effectiveness of a data stream over a cellular network for a device or at the mobile application level. For example, content data can be adapted for a particular mobile device or for a particular application on the mobile device.

In general, in certain examples, the CORA service of the disclosed technology is positioned within a system architecture that includes a content host or provider and a consuming mobile device, and processes requests and responses interactively to find opportunities to reduce data usage. Methods in some examples of the disclosed technology can include lossless file compression and decoding for files that need full reconstitution on the receiving end, lossy transcoding, lossy data compression, e.g. for image file size reduction, intelligent video content shaping that reduces resolution or frame rates and corresponding data, and caching of data for processing and performance enhancements.

The disclosed technology can, in some examples, operate to reduce bandwidth demands thus resulting in less data consumed for delivering the same or similar content and user experience. The disclosed technology may, in some examples, provide reduced data transmission benefits to entities, such as infrastructure operators managing the usage of their networks, regardless of the network technology utilized, or end users that procure wholesale data at reduced cost.

The CORA service stack can, in particular examples, utilize feedback provided by the CORA mobile application to intelligently shape content for delivery to the end user's mobile device, taking into account the nature of the content request, the mobile device and dynamic status of the transmission medium.

The disclosed technology can be run on a variety of topologies, such as cloud-based servers, remote and on-premises servers, and routers in different examples. The disclosed technology can utilize a mobile application loaded on each device to coordinate these content shaping strategies to deliver sufficient quality of the user experience based on the dynamic status and operating mode of the transmission network, e.g. cellular network. Cellular network dynamic status is dependent on such factors as, for example, weather, user concentration and network congestion, and condition of the network gear. Cellular operating mode is determined by the network operator, such as the management and control of resources at the network and transport layers, hardware and software.

Note that while the disclosed technology is referenced for purposes of simplicity and readability using the term CORA throughout the specification, the term should not be interpreted as limiting the disclosed technology in any way. Further, the term should not be interpreted to infer the inclusion of features from particular examples that are described herein that are not expressly set forth in the claims as written.

FIG. 1A is a simplified architecture diagram that illustrates one example of a communications system 100 suitable for implementations in accordance with certain aspects of the disclosed CORA technology. In this example, mobile client devices 110 are in communication with a cellular data network or service 130, which will be generally referred to herein as a cellular data network (CDN) for reasons of clarity and readability.

The CDN service 130, along with content services 120 and CORA service 140 are in communication with network or networks 150, e.g. the Internet Backbone, which can provide communication with a high level of bandwidth between the content servers 120, CDN service 130 and CORA service 140. CDN service 130 provides data networking services to the mobile clients 110 and communication through network 150 with content services 120 and CORA service 140. Content services 120 generally provide content or other services, such as a social networking service, a video streaming service, a dynamic caching service, etc., to mobile clients 110 via CDN 130.

Mobile client devices 110 can be configured with a CORA mobile client application implemented, for example, as a Virtual Private Network (VPN) client that is installed and running in background on the mobile client device. In this example, a CORA mobile VPN client can be in communication with the CORA service 140 through a VPN tunnel that passes through the wireless network of CDN service 130, e.g. a cellular telephone network, and fixed-wire backbone network 150. In certain examples, the mobile application in accordance with the disclosed technology, e.g. the CORA mobile client application in client 110, can provide client content feedback to the CORA service 140.

In certain examples, the content service 120 and the CORA mobile client application in client 110 can be connected via a Virtual Private Network (VPN) tunnel that provides for secure communications between them. The VPN tunnel generally has an associated VPN certificate. In some examples, the VPN tunnel can be supported by the CORA service 140, which can function as a trusted entity in a trust chain between the client and the content service.

In general terms, the CORA service 140 receives content data for a mobile device 110 from the content service 120. In various examples, the CORA service 140 can secure the content stream to the mobile device 110 using the VPN tunnel and shape the data stream of the content data to improve the efficiency of the transmission channel, e.g. a mobile network transmission, and, utilizing feedback from the CORA mobile client application, to adapt to certain performance characteristics of the mobile device or an application on the mobile device, e.g. a streaming video application. Shaping or adapting the content data for the characteristics of the mobile device can alleviate of the bandwidth limitation problems often experienced in the CDN service 130 when providing data service to the mobile devices 110.

FIG. 1B is a functional block diagram that illustrates one example of a communications architecture 160 according to certain aspects of the disclosed technology. The example of FIG. 1B illustrates one example of a functional relationship between a CORA mobile application 112 in mobile device 110 and CORA service 140.

Examples of CORA service 140 can include multiple services for managing bandwidth usage in CDN 130, e.g. bit rate throttling, data reduction for image, text or video, codec management, dynamic caching, usage detail, device or license management, content port or protocol management, and route management. Certain examples of the CORA service 140 can include additional services, such as codec add-ons for HTML, email, attachments, and binaries, as well as least cost optimization and video shaping by control of size and resolution of content.

In the example of FIG. 1B, CORA service 140 includes a control module 142 to establish and control a communication channel between mobile device 110 and content service 120. Content data, such as HTML documents, audio or video data, is sent as packet payload data from content service 120 to the CORA service 140 via internet connection 122. Control module 142 determines how to process and route content received by CORA service 140 from content service 120.

In various examples, CORA service 140 can be implemented in dedicated infrastructure, in cloud-based resources, or a combination of both. A VPN service can be utilized to connect mobile devices 110 to CORA service 140. In certain examples, a VPN client configuration 114 can be automated by the CORA mobile client application 112, which can install and activate a self-signed certificate. The CORA mobile client application 112 can interact with a user of the mobile device 110 to obtain permission for the CORA mobile client application 112 to perform its processes. When the VPN service 114 has been activated on the mobile device 110, data traffic for applications on the mobile device 110 can be routed through the CORA service 140 via VPN tunnel 164.

In this example, the CORA mobile client application 112 uses secure real-time bi-directional communications to maintain a persistent connection between the mobile device 110 and the CORA service 140, and coordinate bandwidth optimization strategies of the CORA service 140 with conditions on the mobile device 110.

In some examples, CORA mobile client application 112 can have characteristics similar to mobile applications used for many VPN services and can automatically connect the user to the CORA service services. The mobile application can be updated automatically and functionality can be updated and expanded over time. The CORA mobile client application 112 may routinely check for connection to the CORA service 140 using a "health check" protocol to maintain a persistent connection to the CORA service.

In particular examples, the CORA mobile client application can provide feedback to the CORA service 140. The feedback can relate to service performance, such as a simple test or a test period, as well as system intelligence that reports data usage by a content provider and an application on the mobile device or the data usage of the mobile device.

In some examples, generally, the CORA service 140 can manage devices, which have unique identifiers. Unique device information can be captured during the activation process and assigned a system generated code for tracking activity and managing device validation post activation. This approach can be utilized to protect device anonymity and user privacy.

Control 142 can, in some examples, invoke ABR module 143 to perform bandwidth throttling by injecting a packet delay into a transmission channel to mobile client 110, which can invoke an ABR response in consuming applications in mobile client 110 to reduce the bit rate of the transmission channel used for delivering content data to mobile client 110 via CDN service 130. To reduce the bit rate, control module 142 injects a delay in packet transmission to a data communication channel from CORA service 140 to mobile device 110. The injected delay activates an ABR capability that is typically incorporated into native application video players and browsers such that the bit rate of the communication channel is automatically lowered in the mobile device 110.

Note that bit rate reduction utilizing ABR in CORA service 140, because it can utilize the ABR capable already present in many native applications, can be implemented, in some examples, with no changes required in the platform or applications of mobile device 110.

Control 142, in certain other examples, can utilize feedback 168 provided by CORA mobile client application 112 regarding mobile device 110. For example, application 112 can provide information regarding the current consumption state, resolution or rate of a video application running on mobile device 110. In these examples, application 112 can provide information regarding the video, photo, social networking and other consuming applications on mobile device 110. In further examples, user selections of applications or channels to receive specified or preferred service levels can be input to application 112 by a user and conveyed to control 142.

Control 142 can also invoke IVS module 144 to modify the content data, such as through lossy or lossless compression, format or protocol conversion (e.g. converting an image file to a different file type), or transcoding (e.g. recoding the data using a different coding scheme), to reduce the amount of content data before transmission via CDN 130 on wireless transmission channel 132.

In one particular example, a JPG file that is 3.35 Megabytes is processed by IVS module 144 to convert the file to a BPG format file of 97.6 kilobytes. The compressed BPG file is transmitted over CDN 130 to the CORA mobile client application 112, which uses BPG decompression to decompress the BPG file to a JPG file of 350 kilobytes. The compression and decompression is lossy, but the bandwidth usage is reduced substantially and the resulting quality of the image in the JPG file is 90% of the original.

When the CORA service 140 routes the compressed content data to the mobile device 110 with CORA mobile client application 112, in this example, service 140 includes instructions for decompression of the data. The CORA mobile client application 112 in device 110 decompresses the compressed content data using the decompression instructions from the CORA service to restore the content data in the mobile device 110.

In addition, control 142 can route the content data through VPN module 146, which establishes a VPN tunnel connection 164 to VPN module 114 of mobile device 110. The VPN module 146 provides a communication wrapper for the VPN tunnel. Alternatively, control 142 can route the content data through WIFI module 148 if a WIFI connection 166 to WIFI module 116 in mobile device 110 if the WiFi connection is available.

Control module 142 can be in communication with CORA mobile client application 112 installed and running on mobile device 110 via a control channel 162. Control module can send information to the mobile client application 112 to indicate the type of encoding or routing that is being utilized to send content data through CDN 130 to mobile device 110. For example, if the content data has been compressed by IVS module 144, control 142 can indicate the compression scheme to CORA mobile application 112. In another example, if content data is being routed in whole or in part via VPN module 146 and VPN connection 164 or via WIFI module 148 and WiFi connection 164, then that information can be conveyed to CORA mobile application 112 so that the content data can be consumed in mobile device 110.

In some examples, control channel 162 can be used by CORA mobile application 112 when mobile device 110 uploads data, e.g. transferring data to cloud storage, sending video or photos to a social networking service, etc. CORA mobile application 112 can utilize many of the content reduction techniques described herein to reduce the amount of bandwidth required in CDN service 130 to upload data to a content service.

For example, in cases where content originates at the mobile device 110, such as media (images, audio or video) or sensor data, the CORA mobile application 112 can process the content on mobile device 110 before transmission over CDN 130. For some examples, the content can be compressed at the originating device or locally in order to reduce bandwidth requirements for transmission over cellular or satellite channels. In some examples, the CORA mobile application 112 and CORA service 140 utilize lossless compression methods and the original content can be restored to its original state at the receiving end of the transmission.

In this example, the CORA mobile application 112 on a remote device compresses data that is sent through CDN 130 to the CORA service 140, which can route the data to a customer data concentrator. The CORA mobile application 112 can apply best-fit compression to aggregate collected data/files to improve throughput. The CORA mobile application 112 on the remove device 110 routes the compressed data to, for example, a cloud-based CORA service 140 where the collected data is decompressed and routed to customer data concentrator, e.g. a data warehouse, over a wired network.

Note that the ABR, IVS, VPN and WiFi functions described herein are provided as examples. Additional or fewer functions can be implemented in examples in accordance with the disclosed technology. In addition, note that multiple functions can be applied individually or in combination to content data in order to reduce the amount of data sent to mobile device 110. For example, a video file can be transcoded, compressed and transmitted at a reduced bit rate via ABR. Many variations and combinations can be utilized in accordance with the disclosed technology.

Figure 2A:
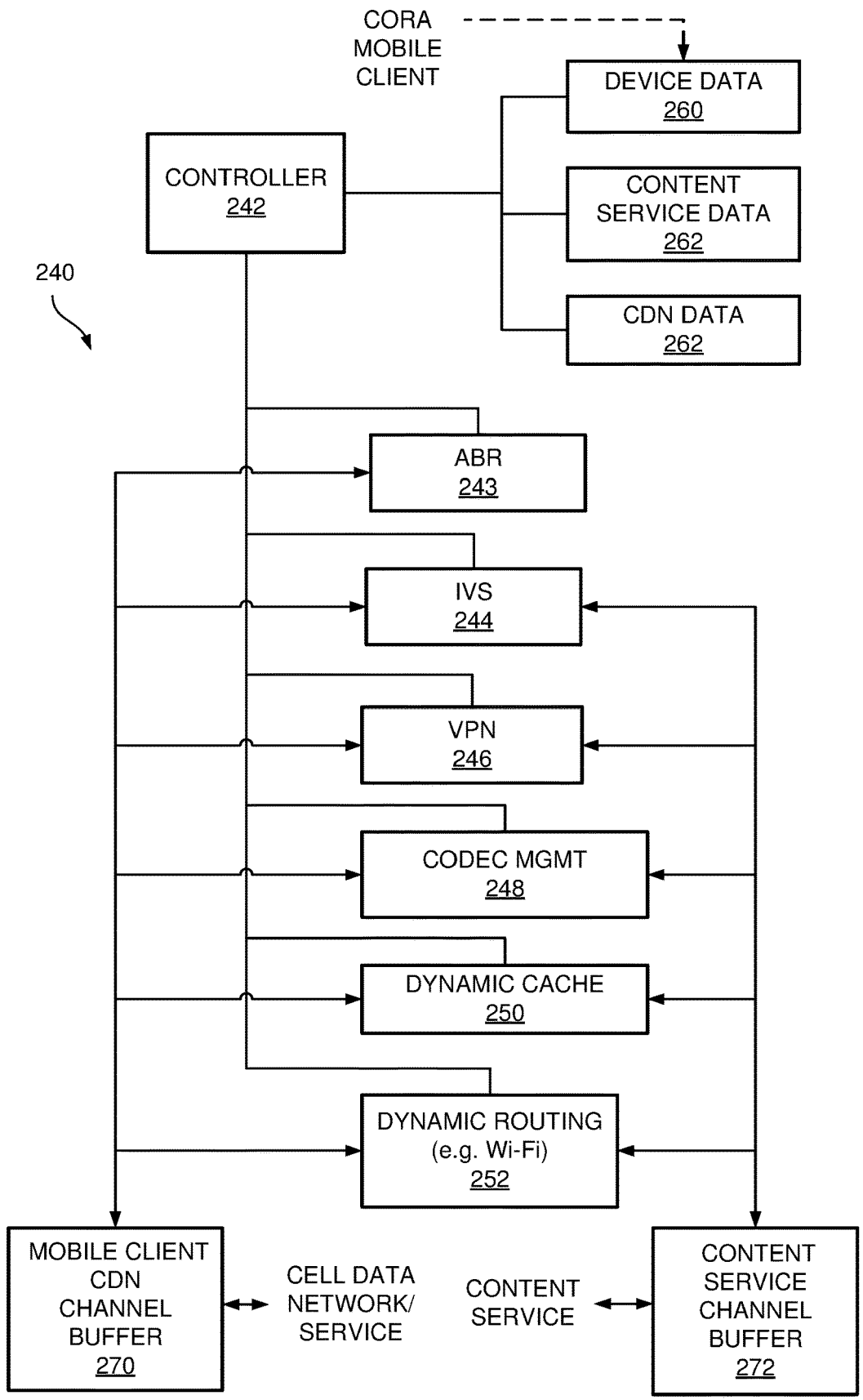
FIG. 2A is a functional block diagram of one example of a system in accordance with certain aspects of the disclosed technology.

FIG. 2A is a functional block diagram of one example of a CORA system 240 in accordance with certain aspects of the disclosed technology. CORA system 240 includes a controller 242 that can control one or more functional modules to manage bandwidth usage in a cellular data network utilized for transmitting content data to or from a mobile client device.

In some examples, the CORA system 240 can determine how to route content in a manner to maintain an acceptable user experience and improve bandwidth utilization in a wireless network. Controller 242 of CORA system 240 can apply routing logic to determine the appropriate way to connect a device to a respective content delivery source depending on the type of content requested, whether directly or through one of the CORA system 240 functional modules for processing (e.g., transcoding, lossless compression, video throttling, or content shaping).

Controller 242 controls the operation, in this example, of multiple functional modules, including ABR module 243, IVS module 244, VPN module 246, codec management module 248, dynamic cache module 250, and dynamic routing module 252. The functional modules can be implemented in hardware, software or a combination thereof. Controller 242 can invoke the functional modules individually or in combination.

Controller 242 of CORA system 240 can utilize functional modules, such as ABR module 243, IVS module 244, or codec management module 248, to process content data to improve bandwidth utilization in a wireless data network, such as CDN 130, to mobile client devices, such as mobile devices 110, to provide an acceptable user experience given network and device status and characteristics.

Controller 242 utilizes these functional modules to process content data received from content services in content service channel buffer 272. For example, controller 242 can process the content data using IVS module 244 or codec management module 248 to shape, e.g. compress or transcode, image or video data from buffer 272 for transmission by mobile client CDN channel output buffer 270. In one example of transcoding and compression, if image content data received from a content source is not in JPG format, then controller 242 invokes IVS module 244 to convert the image content data to JPG format files and compresses the JPG files to a lower file size before transmitting the JPG files over a wireless connection.

In certain examples, the CORA system 240 can also utilize existing content management and transmission methods, such as HTML for web browsers and web services for native applications, to reduce CDN bandwidth usage. For example, controller 242 can inspect HTML tags and the corresponding file(s) and compress the tagged files prior to inclusion in the HTML transmission. The data reduction of HTML tagged files can be significant compared to HTML. Similarly, content with tagged files transmitted over web services can be reduced significantly.

Controller 242 can utilize information about a mobile device in order to determine how to process content data with little or no impact on user experience in the mobile device. This information can include configuration information, such as device form factor of identification of the video, audio or image applications installed on the mobile device, or status information regarding the mobile device, such as playback rate or application status. This information can be provided by a CORA mobile client application installed on the mobile device and the information stored in device data store 260. In one example, IVS module 244 of CORA system 240 can perform transcoding to reduce image size for graphical content with minimal or no impact on a user's viewing experience on a small form factor device.

Further, in some examples, controller 242 can utilize information provided by a content service to determine how to process content data provided by the content service. For example, a minimum resolution level may be specified by the content source for a data file. Rules and information regarding processing can be received from a content source and stored in content service data 262.

Controller 242 may also utilize ABR module 243 to inject a delay in the transmission of data from output buffer 270 to a CDN service in order to perform bit rate throttling on the transmission of content data to a mobile device. For example, the CORA system 240 can utilize information from a CORA mobile client on a mobile device to adapt the transmission bit rate to the configuration of a particular device, such as controlling image resolution for a form factor of a device with respect to a user experience, e.g. smaller form factor user interfaces may provide a satisfactory user experience at lower resolutions.

Controller 242 of CORA system 240 can, in certain examples, also route content data traffic and requests based on specifications and status defined for a cellular data network, e.g. CDN service 130, to determine and apply one or more of the functions described herein to reduce data consumption and improve content delivery to a mobile device. The specification can be provided by a network operator and configured in CDN data storage 262. Also, network status information can be provided by the network operator and stored in CDN data storage 262.

For example, the CORA system 240 can adjust a bit rate for a transmission to a mobile device based on CDN service provider status, such as Radio Access Network (RAN) conditions, or service terms, such as user plan information, or business rules specified by a wireless network operator of the CDN to throttle streaming content. These CDN service specifications can be stored in CDN data storage 262 and accessed by controller 242 to make routing determinations.

In certain examples, route management by controller 242 in CORA system 240 can direct a request from a mobile device to a respective content cache location in dynamic cache 250. For example, controller 242 may route a request for content data that was previously processed, such as caches for transcoded or compressed images, videos or other content that has been processed and staged, can reduce response time and processing overhead in system 240.

In certain examples, controller 242 can dynamically route data traffic through dynamic routing module 252 to alternative connections to a mobile device. For example, if the mobile device has Long-Term Evolution (LTE) service, which may be communicated to controller 242 by a CORA mobile client application on the mobile device, then controller 242 can route content data traffic to the mobile device through the LTE service to reduce bandwidth usage on the CDN. In another example, if the mobile device has a WiFi connection, which may be communicated to controller 242 by a CORA mobile client application on the mobile device, then controller 242 can route content data traffic to the mobile device through the WiFi connection in order to reduce bandwidth usage on the CDN.

Some types of data traffic, such as data from specific content sources or requested by specific applications in the mobile device, can, in some examples, be routed through VPN module 246 through a VPN tunnel to the mobile device. In certain examples, the types of traffic to be routed through the VPN tunnel can be defined in a list accessible to controller 242.

In other examples, controller 242 in CORA system 240 may bypass content data traffic that cannot be decrypted. Generally, content data that cannot be decrypted by the CORA system 240, i.e. the CORA system does not have a certificate for the encrypted content, is not available for transcoding or shaping of the content data to improve network efficiency. For example, the CORA system 240 routing algorithms can employ a proxy, e.g. a Socket Secure (SOCKS) proxy, to bypass content data streams to a mobile device. The CORA system 240 may, for example, maintain a list of URLs, e.g. a list in device data store 260 or content source data store 262, that can be accessed in real-time by controller 242 to identify content data streams that cannot be decrypted and routing the traffic via a bypass accordingly.

An example of a cybersecurity method that may prevent the use of intermediate decryption proxy servers, such as the CORA system 240, is a pinned certificate. In certain examples, content requests from native applications on a mobile device that use pinned certificates may be routed to bypass the CORA system 240 so that the user experience (UX) is not affected in these circumstances.

In certain examples involving HTTPS connections, the content data can be SSL encrypted by a content service and provided to the CORA system 240 for secure transmission to a mobile device. CORA system 240 may provide services with regard to the content data that include SSL/TLS decryption and re-encryption to accommodate secured communication, but allow the decrypted content data to be processed to reduce bandwidth usage.

For example, the controller 242 can apply transcoding to the decrypted data to reduce the impact of images on wireless bandwidth usage. A decryption proxy can decrypt and compress text and images in real-time and log the original and post file sizes for text and images. In these examples, controller 242 can be configured to manage certificates, e.g. VPN certificates, for the secure channel.

Figure 2B:
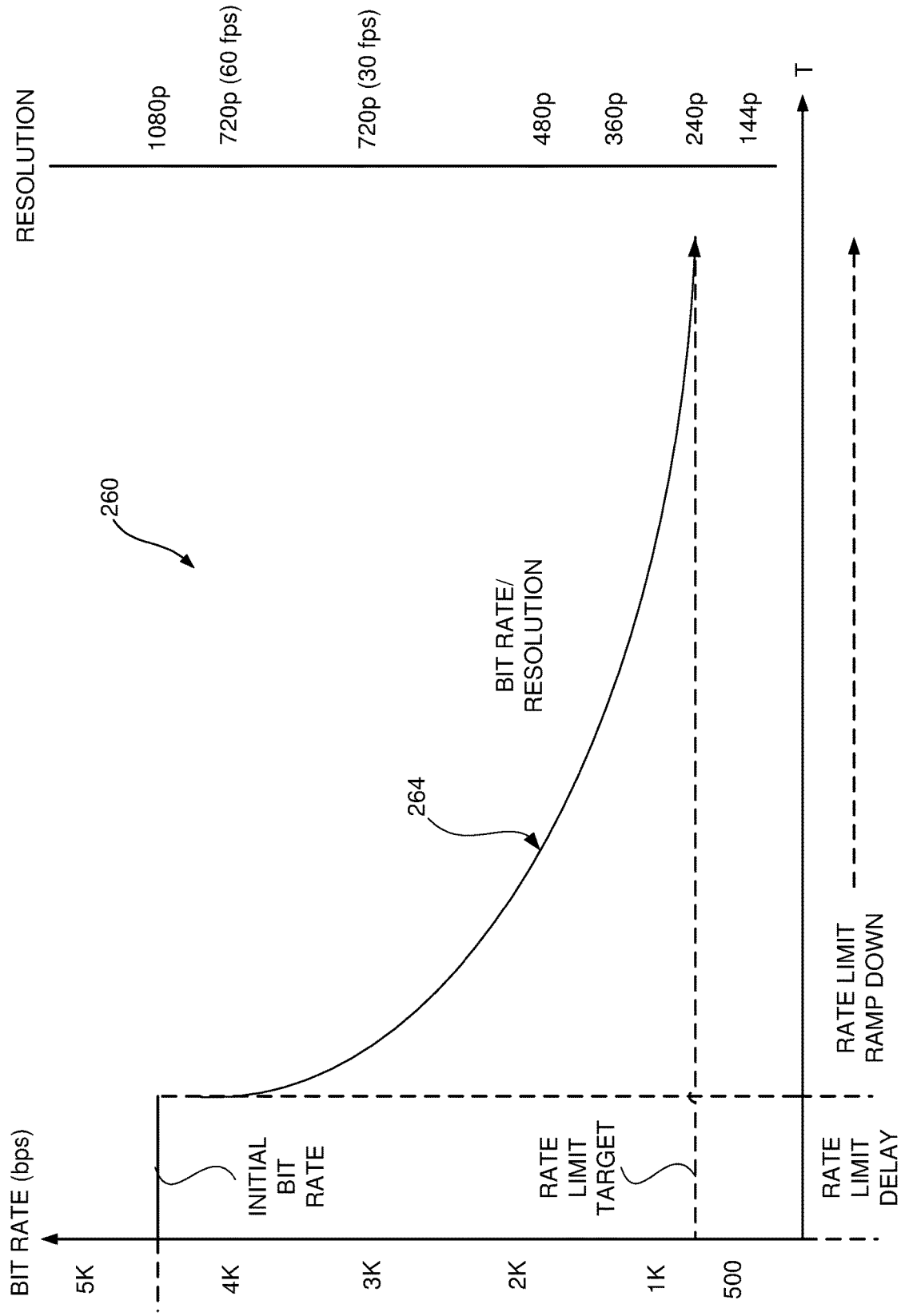
FIG. 2B is a schematic diagram illustrating an example of a bit rate and resolution curve for an adaptive bit rate algorithm that can be implemented in some examples of a system in accordance with the disclosed technology.

FIG. 2B is a schematic diagram illustrating an example of a bit rate and resolution graph 260 for an adaptive bit rate control algorithm that can be implemented in some examples of ABR module 242 of CORA system 240. As noted above, the CORA system 240 can shape or throttle streaming video by strategically introducing a delay into a communication stack of the transmission channel from the CORA system 240 to a mobile device, e.g. devices 110. The introduced delay can activate an adaptive bit rate (ABR) capability that is typically incorporated into native application video players and browsers in the mobile device. Bit rate to resolution curve 264 is an example of a control relationship that can be utilized to determine a duration of the introduced delay that can achieve a target bit rate or resolution.

The injected or introduced delay can decrease streaming video resolution by causing the application buffer of the player to fill up slower than it would without the introduced delay, which in turn activates the ABR capability of the application on the mobile device. Typically, video streams are configured to initiate at a low resolution and the resolution is adjusted dynamically based on how quickly or slowly the buffer fills up.

For example, if the application ABR detects that the buffer is filling up faster than the playback speed, then the ABR increases the resolution of the video stream. However, if the ABR determines that the buffering is just keeping up with playback speed, then the ABR maintains the resolution at its current level. If the ABR detects that the buffer is overflowing, full or filling slower than the playback speed, then the ABR can reduce the resolution further, e.g. 144$p$, to reduce the amount of streaming content data.

In one example, controller 242 of CORA system 240 determines the streaming resolution at an initial bit rate during a short trial period of 10-20 seconds, depending on packet length, e.g. 1080p resolution at 4500 bps. An ABR delay can then be introduced by the ABR module 243 to the transmission channel for the content data. A duration of the ABR delay can be varied to control the bit rate/resolution. As the time duration of the ABR delay is increased, the bit rate and resolution ramp down from the initial bit rate and resolution to a rate limit target, e.g. 240p at 800 bps.

Figure 3A:
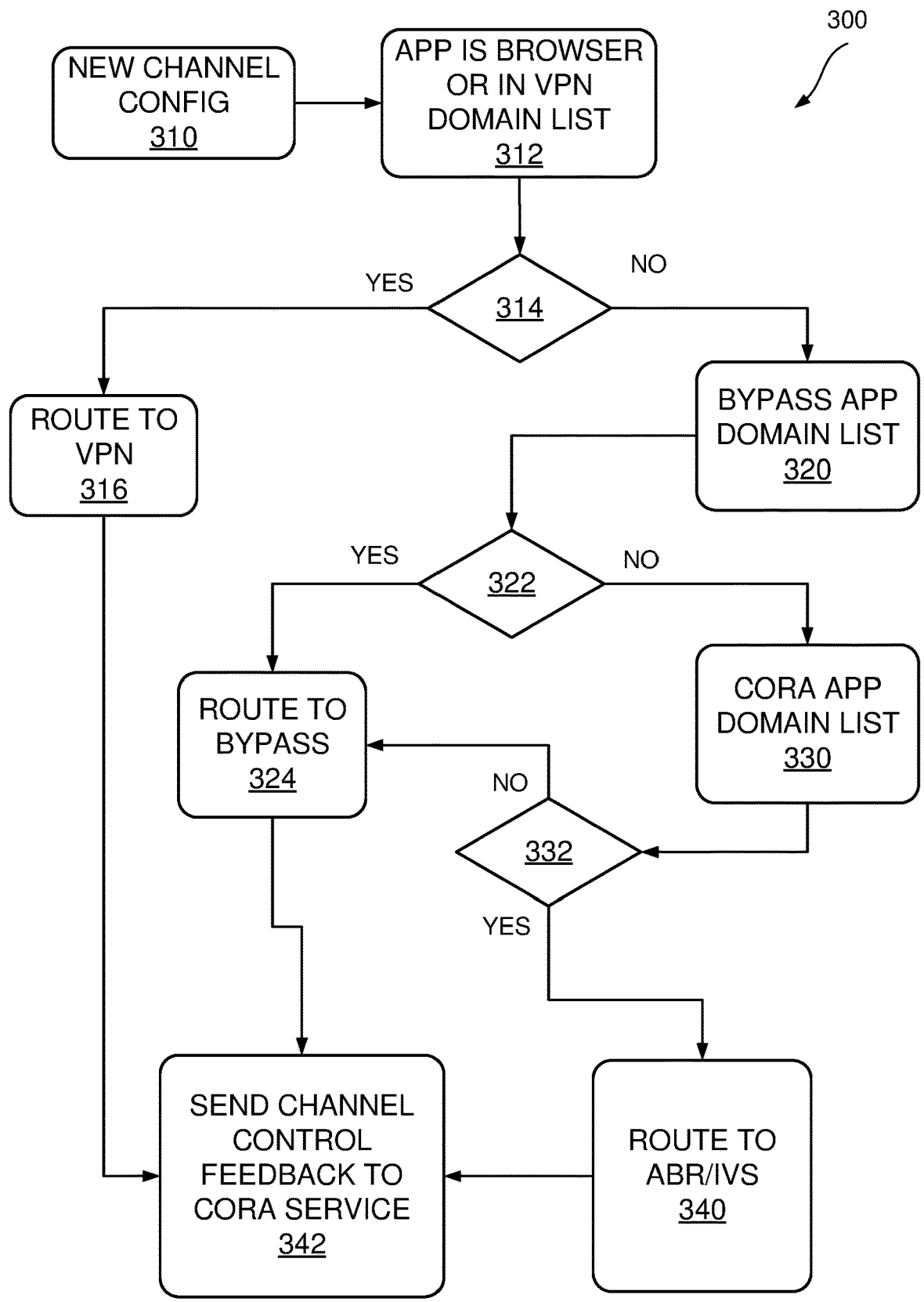
FIG. 3A is a control flow diagram illustrating an example of a communications routing control process in a mobile client application in accordance with the disclosed technology.

FIG. 3A is a control flow diagram illustrating an example of a communications routing control process 300 in a mobile client application, such as CORA mobile client application 112, in accordance with the disclosed technology. Process 300 can operate in a mobile device, such as mobile device 110, to establish a communication channel with a CORA service, such as CORA service 140 or service provided by CORA system 240, in accordance with the disclosed technology.

In this example, at 310, the process begins to automatically establish a communication channel for handling content data for a content consuming application, such as a browser, video, audio, communication or social networking application. Process 300 can, for example, be initiated when the mobile client application, such as CORA mobile application 112, is provisioned on a mobile device. In other examples, process 300 may execute in response to input from a user of the mobile device or when a consumer application is installed on the mobile device. In still other examples, process 300 executes in response to a content data request from an application on the mobile device, e.g. a browser or streaming video application.

At 312, a check is performed for whether the consumer application is a browser application or in a pre-configured VPN domain list. The VPN domain list, in this example, lists applications that will be routed to a VPN connection to a CORA service. An example of a VPN domain list could include specific applications for which it is undesirable to modify content data to reduce bandwidth, e.g. mobile banking or healthcare applications.

If an identifier for an application is found in the VPN list, then control branches at 314 to 316 to route content data for the application through a VPN tunnel to the CORA service, such as VPN tunnel 164 through VPN module 114 associated with CORA mobile application 112 and VPN module 146 in CORA service 140. Control continues to 342, where control feedback is provided to the CORA service, e.g. through control feedback channel 168 to controller 142, to indicate that content data for the application is routed through the VPN tunnel.

If the application is not found in the VPN list, then control branches at 314 to 320 to determine whether the application is listed in a bypass application domain list. The bypass application domain list can, for example, include applications with encryption that cannot be decrypted by the CORA service, e.g. pinned applications or HTTPS flows.

If the application is found in the bypass application domain list, then control branches at 322 to 324 to bypass the content data for the channel directly to and from the destination endpoint for the content, e.g. a content service 120. Control continues to 342 to notify the CORA service that traffic for the channel is bypassed to direct communication through the CDN, e.g. CDN service 130.

If the application is not found in the bypass list, then control branches at 322 to 330 to determine whether the application is listed in a CORA application domain list. The CORA application domain list can, for example, include streaming video, audio, social networking or communication applications as well as native applications for playing content embedded in browsers or other applications, which are suitable for application of bit rate throttling and content shaping strategies in accordance with the disclosed technology.

If the application is not found in the CORA application domain list, then control branches at 332 to 324 to bypass the content data for the channel directly to and from the destination endpoint for the content, e.g. a content service 120. Control continues to 342 to notify the CORA service that traffic for the channel is bypassed to direct communication through the CDN.

If the application is found in the CORA application domain list, then control branches at 332 to 340 to process the content data for the channel using, for example, the ABR and/or IVS strategies described herein for reducing bandwidth usage for the traffic using the channel. Control continues to 342 to notify the CORA service that traffic for the channel can be processed to reduce bandwidth usage.

Note that process 300 is one example for establishing a content data channel. Other approaches can be employed that are in accordance with the disclosed technology. For example, all video applications can be routed for processing to reduce bandwidth usage. In some examples, the lists can reflect selections made by a user of the mobile device using the CORA mobile client application, e.g. applications selected by the user for bandwidth reduction processing. The lists can also reflect determinations made by a CDN operator or service subscriber as to which applications will be subjected to bandwidth reduction processing. A variety of approaches can be utilized that can be in accordance with the disclosed technology.

Figure 3B:
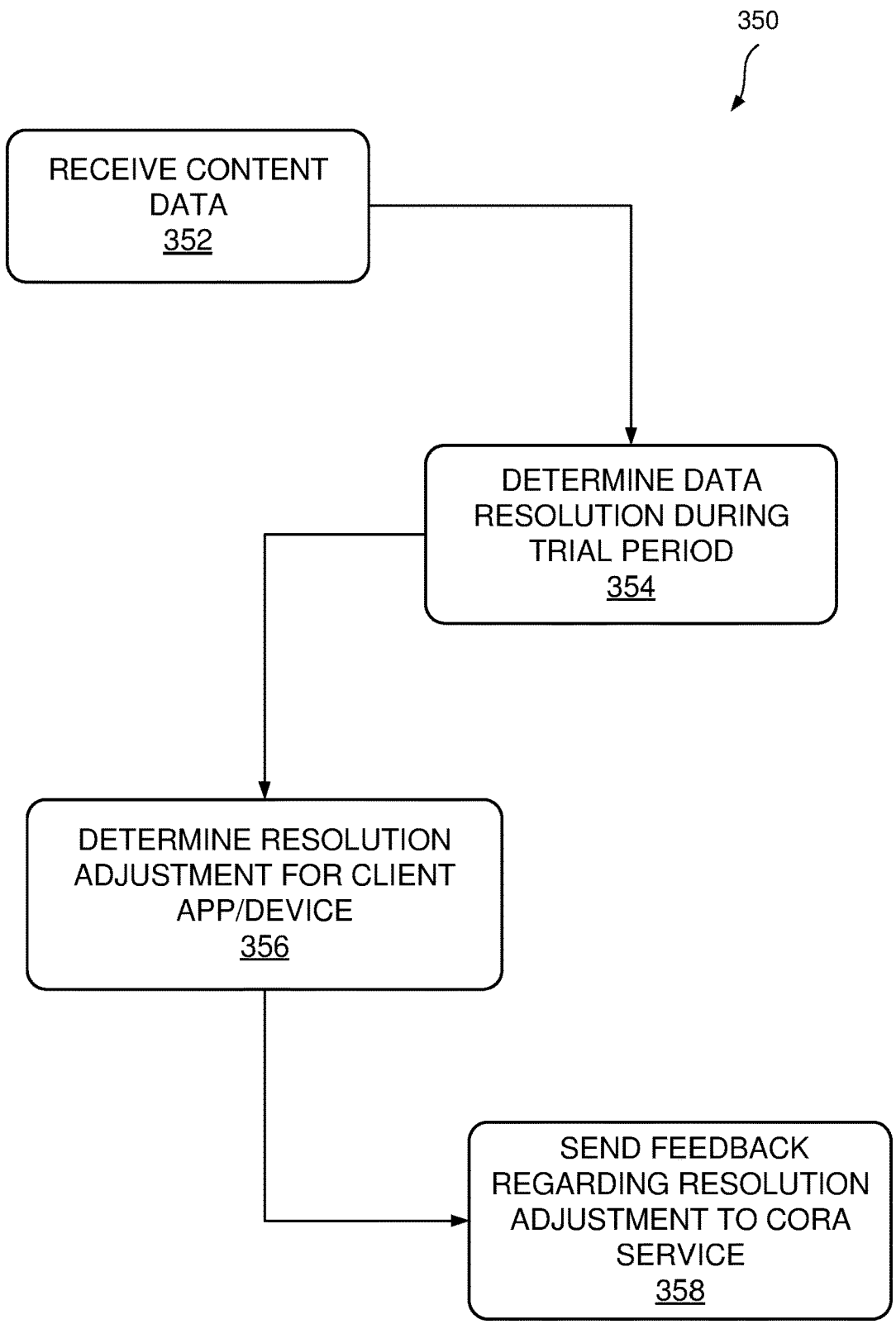
FIG. 3B is a control flow diagram illustrating an example of a content resolution control process in a mobile client application in accordance with the disclosed technology.

FIG. 3B is a control flow diagram illustrating an example of a content resolution control process 350 in a mobile client application, such as CORA mobile client application 112, in accordance with the disclosed technology. Process 350 can operate in a mobile device, such as mobile device 110, to provide mobile device specific feedback to a bit-rate control process in a CORA service, such as CORA service 140 or service provided by CORA system 240, in accordance with the disclosed technology.

In this example, at 352, content data is received in a communications channel from the CORA service. At 354, the resolution of the content data is determined at an initial bit rate during a trial period of the data transmission. At 356, a resolution adjustment is determined for the client application or device, e.g. increase or reduce the bit-rate for the channel.

At 358, the resolution adjustment determination, e.g. increase or decrease, is sent in feedback to the CORA service, e.g. via feedback channel 168 to control 142, so that the control process in the CORA service can utilize ABR strategies to adjust the bit rate of the channel to obtain the best-fit resolution.

The resolution determination made at 356 can, for example, be based on how quickly or slowly that an application buffer of a video player application is filling up. For example, if the video application buffer is filling up faster than the playback speed, then the determination can be to increase the resolution of the video stream. If the video application buffering is just keeping up with playback speed, then the determination can be to maintain the resolution at its current level. If the video application buffer is overflowing, full or filling slower than the playback speed of the video application, then the determination can be to decrease the resolution of the video stream. This feedback can be provided by the CORA mobile client application to the CORA service so that it can adjust a bit rate of the channel or the resolution of the content data.

Figure 3C:
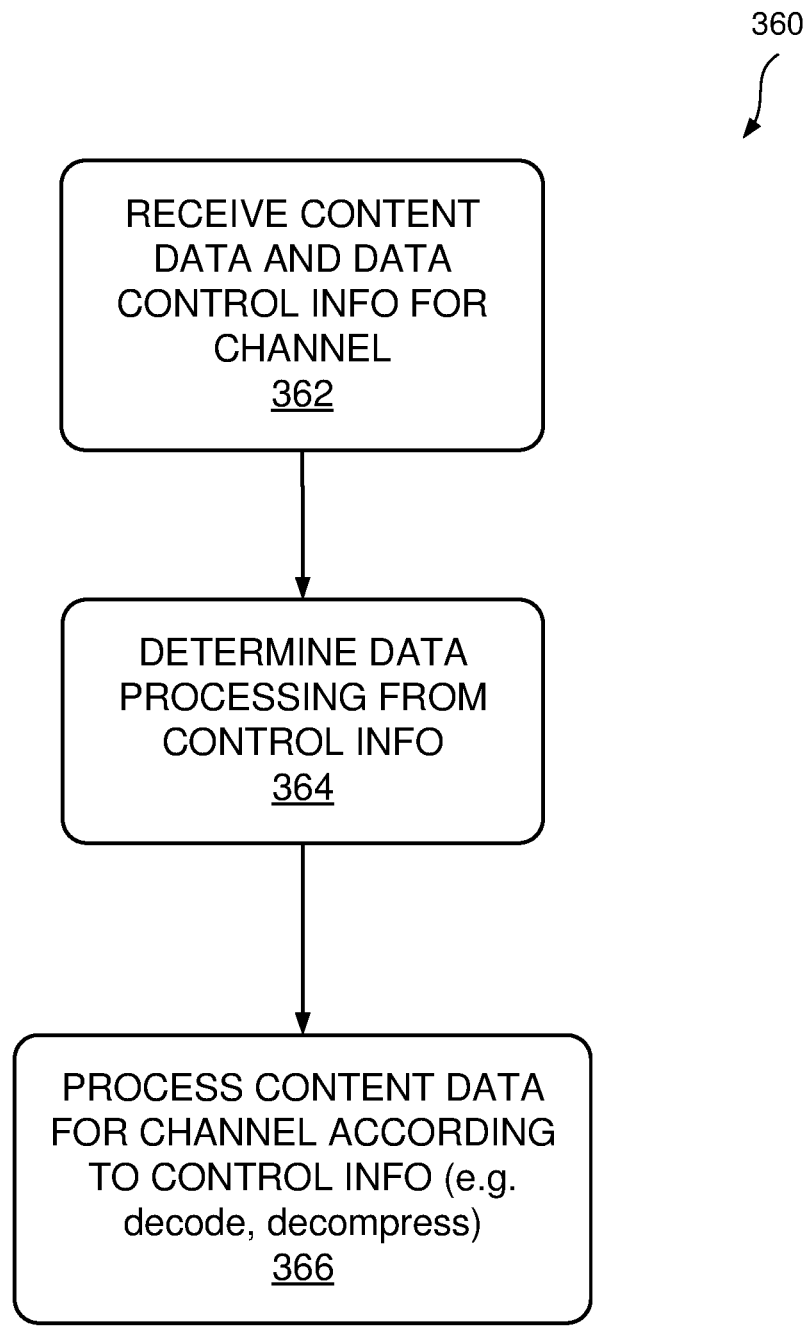
FIG. 3C is a control flow diagram illustrating an example of a content data control process in a mobile client application in accordance with the disclosed technology.

FIG. 3C is a control flow diagram illustrating an example of a content data control process 360 in a mobile client application, such as CORA mobile client application 112, in accordance with the disclosed technology. Process 360 can operate in a mobile device, such as mobile device 110, to process content data received from the CORA service to, for example, reconstruct the content data based on control information provided by the CORA service. Process 360 can, for example, execute when the mobile client application, such as CORA mobile application 112, receives content data on a communications channel established with the CORA service.

At 362, in this example, content data along with data control information is received in the communication channel with the CORA service. Data control information can, for example, indicate compression protocol or transcoding information relating to the processing that the content data received in the CORA service and that can permit the mobile client application to reconstitute the content data for consumption by a consumer application on the mobile device. In some examples, the data control information can be embedded in the content data, e.g. decompression information included in data packets for the content data. In other examples, the data control information can be received through a control channel with the CORA service.

At 364, the mobile client application determines the data processing to be performed on the received content data. At 366, the mobile client application performs the processing determined for the content data from the control information. For example, the control information can indicate that the content data was compressed according to a compression protocol, which is determined at 364, and decompression of the content data in accordance with the compression protocol is performed at step 366.

Figure 3D:
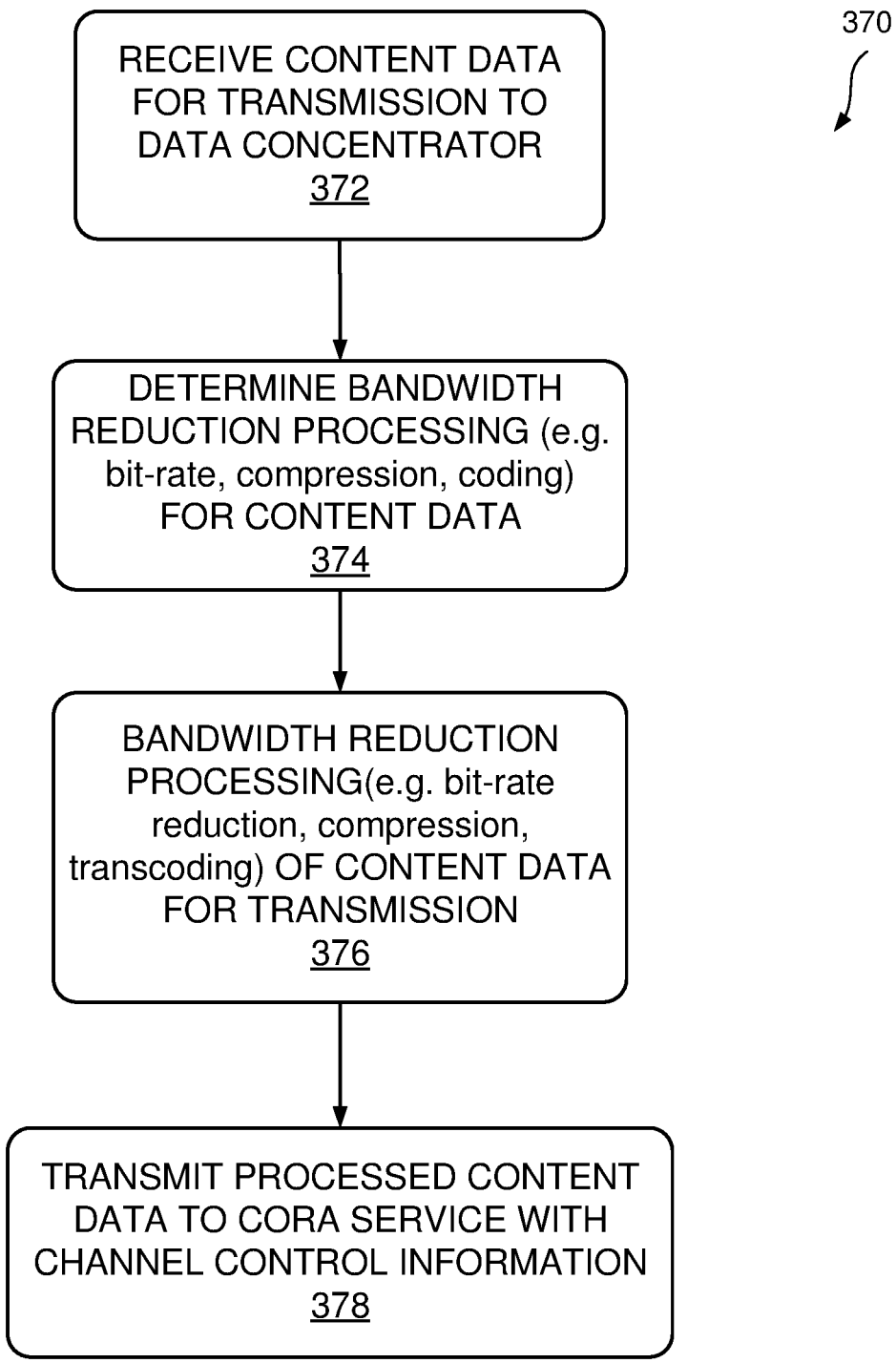
FIG. 3D is a control flow diagram illustrating an example of a content data upload control process in a mobile client application in accordance with the disclosed technology.

FIG. 3D is a control flow diagram illustrating an example of a content data upload control process 370 in a mobile client application, such as CORA mobile client application 112, in accordance with the disclosed technology. Process 370 can operate in a mobile device, such as mobile device 110, to process content data to be uploaded to the CORA service to, for example, reduce the bandwidth usage for uploading the content data through content shaping. Process 370 can, for example, execute when the mobile client application, such as CORA mobile application 112, receives content data from an application on a mobile device for upload content to a data concentrator, e.g. a content service that provides cloud storage or a social networking service that allows upload of video files, through a communication channel to the CORA service.

At 372, the mobile client application receives the content data for transmission to the data concentrator. At 374, the mobile client application determines the bandwidth reduction processing, if any, to be performed on the content data to be uploaded. At 376, the bandwidth reduction processing, e.g. compression, transcoding, or bit-rate or resolution adjustment, is performed on the content data.

At 378, the processed content data is transmitted to the CORA service and channel control information is provided to the CORA service. For example, the content data can be transmitted at 378 on the channel to the CORA service at a reduced bit-rate determined from the resolution of the content data at 374, in which case the control information can be implicitly sent to the CORA service in the transmission bit-rate. In another example, the content data can be compressed at 376 and transmitted at 378, in which case the control information can be sent to the CORA service embedded in the packets of the content data. In still another example, the content data can be transcoded at 376 and transmitted at 378, in which case the control information describing the transcoding parameters can be sent to the CORA service in a control channel.

As discussed above, the CORA service in accordance with the disclosed technology generally utilizes one or more bandwidth reduction strategies to reduce data usage in a network, such as a cellular data network, e.g. CDN service 130. One example of a bandwidth reduction strategy is through manipulation of ABR, wherein a data packet delay is introduced into a content data delivery channel to automatically activate an ABR function in a consuming application, as described herein.

Another example of a bandwidth reduction strategy is through shaping the content of various forms of content data, such as text, images, video, binary files or other data types, to reduce bandwidth demands for the data resulting in less data consumed for delivering the content. Shaping the content can, for example, involve lossy or lossless transcoding, lossy or lossless file compression. These bandwidth reduction strategies can be utilized with little or no impact on the user experience of a user of a mobile device.

Figure 4A:
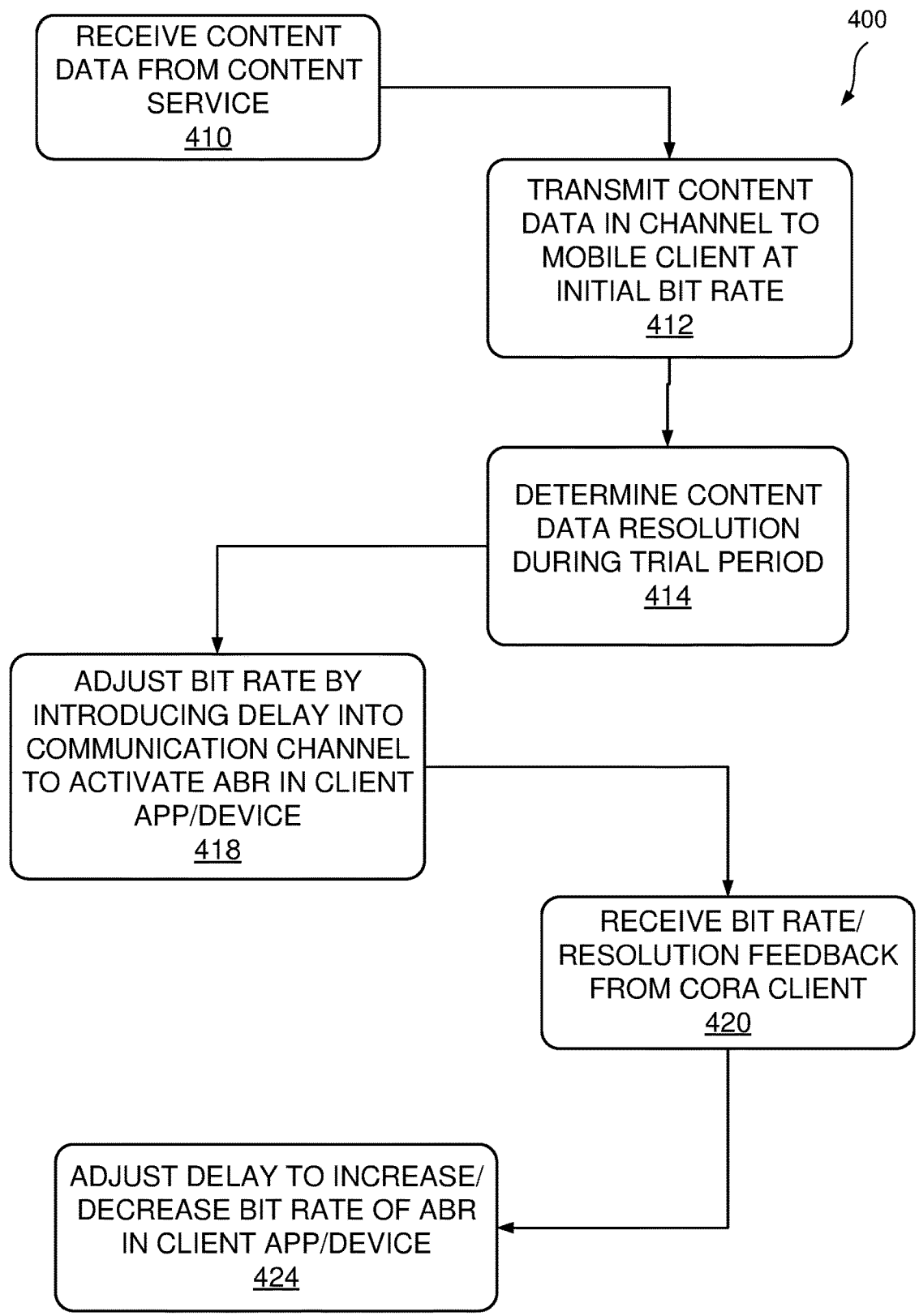
FIG. 4A is a control flow diagram illustrating an example of a content data transmission bandwidth management process in accordance with certain aspects of the disclosed technology.

FIG. 4A is a control flow diagram illustrating an example of a communications process 400 for bandwidth reduction in a CORA service according to certain aspects of the disclosed technology. At 410, the CORA service, e.g. CORA service 140 or service provided by CORA system 240, receives content data from a content service, e.g. content service 120, directed toward a mobile device, e.g. mobile device 110, managed by the CORA service. At 412, the CORA service transmits the content data to the mobile device in a communication channel at an initial data bit-rate for transmission of the content data, e.g. a bit-rate corresponding to a full resolution of the content data.

At 414, the CORA service determines a content data resolution appropriate for the destination client application during a trial period at the beginning of transmission of the content data. In one example, this determination can be based on characteristics of the destination client application, e.g. a resolution of the destination client application, or mobile device, e.g. a form factor of the mobile device. In another example, this determination can be based on a rate of consumption of the content data in an input buffer of the destination client application. This determination can include identifying a target bit-rate for the content data corresponding to a resolution of the content data, e.g. a best fit streaming resolution for the client application or device. At 418, the CORA service adjusts a bit-rate of the channel for the content data by introducing a delay in the communication channel to activate the ABR in the client application or device.

At 420, the CORA service can receive feedback from the CORA mobile client application regarding the status of content consumption in the client application or device, e.g. information as to whether the input buffer for the destination client application buffer is overflowing or filling slower than the playback speed. Process 350 in FIG. 3B illustrates one example of a process in the CORA mobile client application that can provide feedback to the CORA service for adjusting a bit-rate or resolution of content data. At 424, the CORA service can use this feedback to adjust the introduced delay to increase or decrease the bit rate of the ABR in the destination client application or device.

Figure 4B:
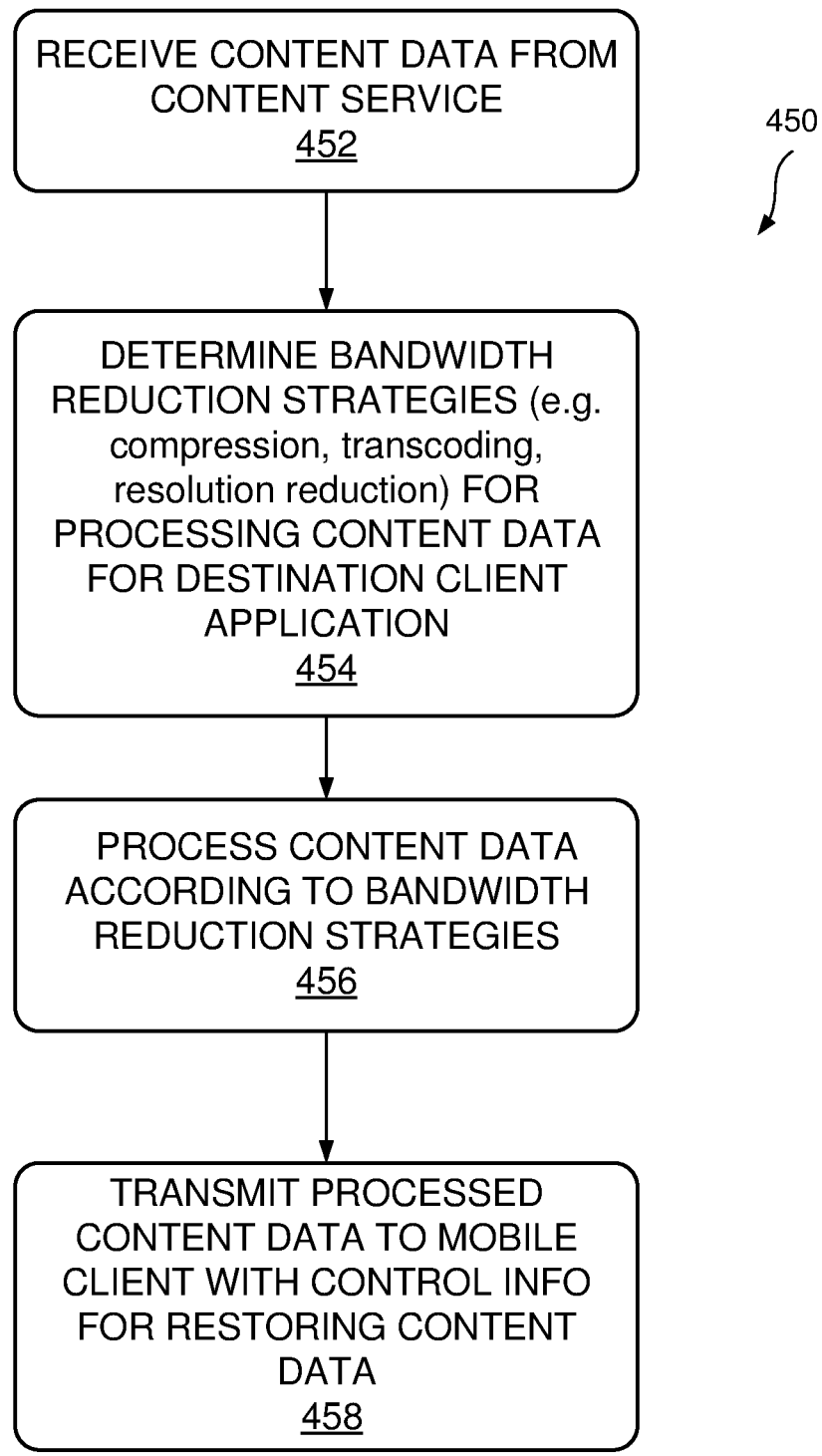
FIG. 4B is a control flow diagram illustrating an example of a communications process for compressing content data in accordance with certain aspects of the disclosed technology.

FIG. 4B is a control flow diagram illustrating an example of a communications process 450 for bandwidth reduction based on compressing or transcoding content data in accordance with certain aspects of the disclosed technology. At 452, the CORA service receives content data from a content provider service that is directed to a mobile device.

At 454, the CORA service can determine a compression, resolution or transcoding suitable for the content data for the destination mobile device. The suitable compression, resolution or transcoding can be determined based on the characteristics and status of the mobile device or a wireless network for communicating with the mobile device, e.g. IVS. These strategies can be applied individually or in combination. For example, content data for an image file or video file can be transcoded from one format to another to reduce the amount of data, the resolution of the image or video data can be reduced to a resolution level suitable for the destination client application to further reduce the amount of data, and the transcoded, reduced resolution content data can be compressed to still further reduce the amount of data.

At 456, the CORA service compresses, transcodes or reduces the resolution of the content data and, at 458, sends the resulting processed content data with processing control information, e.g. compression type and parameters, to the CORA mobile client application in the mobile device. As described above with respect to process 360 in FIG. 3A, the CORA mobile client application can process the content data in accordance with the processing control information to reconstitute, e.g. decompress, the content data. The reconstituted content data can then be consumed by the destination client application, e.g. a native application on the mobile device.

Computer Architectures for Content Transmission Management

Figure 6:
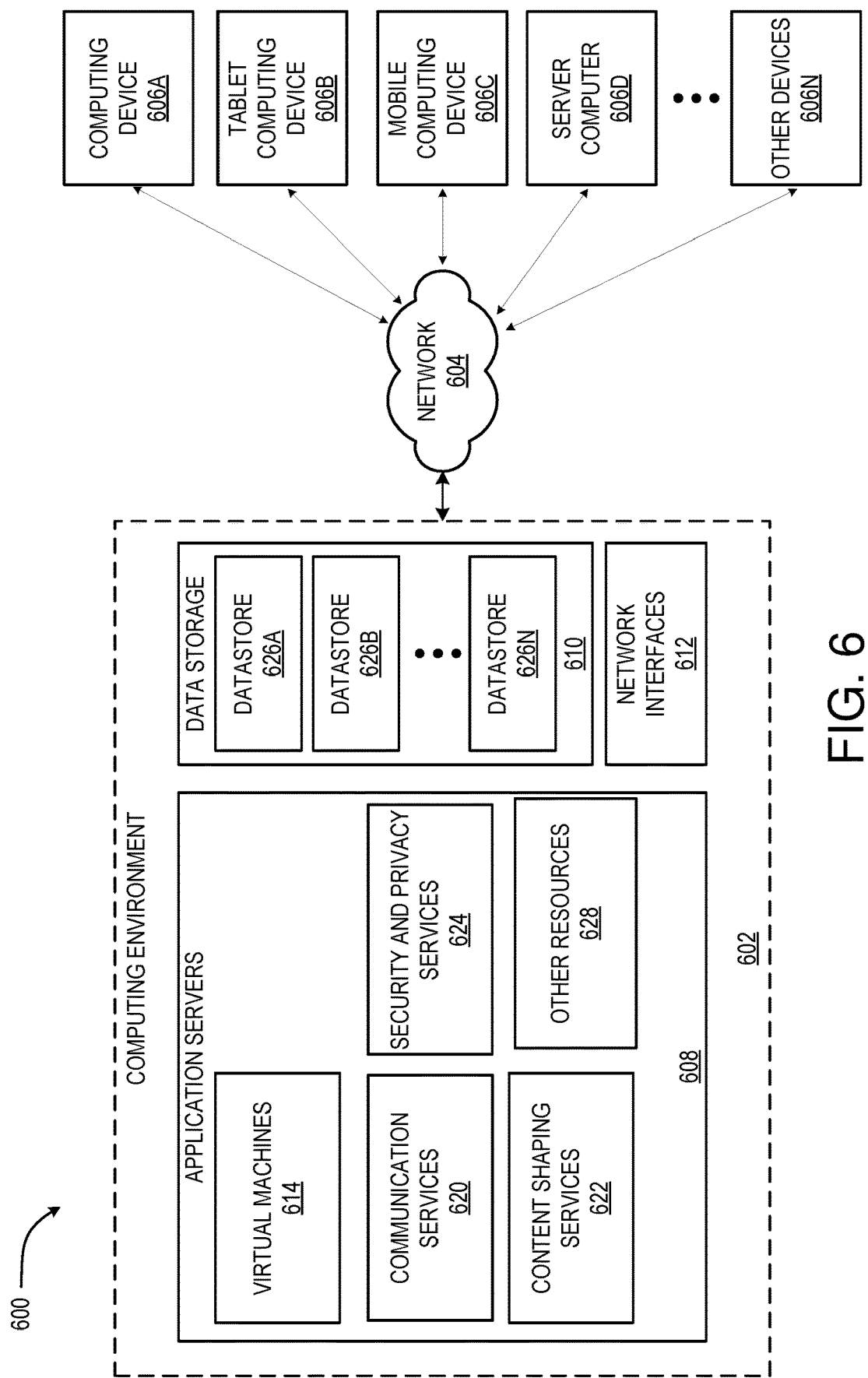
FIG. 6 is a diagram illustrating a distributed computing environment capable of implementing aspects of the techniques and technologies presented herein.

Note that at least parts of processes 300, 350, 360 and 370 of FIGS. 3A-D and processes 400 and 450 of FIGS. 4A-B and other processes and operations pertaining to content transmission management described herein may be implemented in one or more servers, such as computer environment 600 in FIG. 6, or the cloud, and data defining the results of user control input signals translated or interpreted as discussed herein may be communicated to a user device for display. Alternatively, the content transmission management processes may be implemented in a client device. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines (e.g. processes 300, 350, 360 and 370 of FIGS. 3A-D and processes 400 and 450 of FIGS. 4A-B) are described herein as being implemented, at least in part, by an application, component, and/or circuit. Although the following illustration refers to the components of FIGS. 3A-D and FIGS. 4A-B, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of the FIGURES discussed above, it can be appreciated that the operations of the routines (e.g. processes 300, 350, 360 and 370 of FIGS. 3A-D and processes 400 and 450 of FIGS. 4A-B) may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 5:
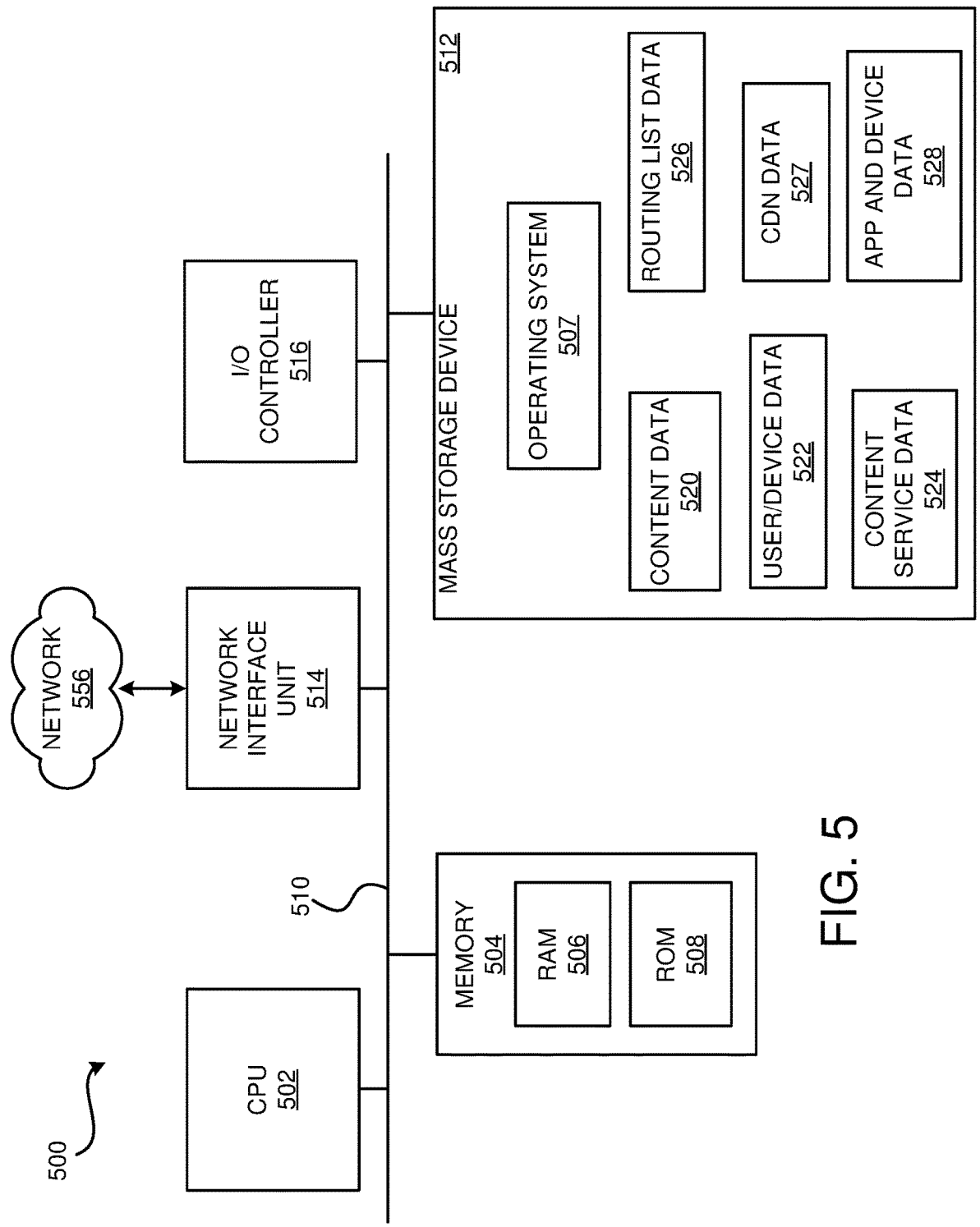
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a computer, such as the mobile devices, CORA service, and content services in FIGS. 1A, 1B, and 2A-E, capable of executing the program components described herein. Thus, the computer architecture 500 illustrated in FIG. 5 illustrates an architecture for an on-board vehicle computer, a server computer, mobile phone, a PDA, a smart phone, a desktop computer, a netbook computer, a tablet computer, an on-board computer, a game console, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between sub-elements within the computer architecture 500, such as during startup, is stored in the ROM 508. The computer architecture 500 further includes a mass storage device 512 for storing an operating system 507, data (such as content data 520, user or device data 522, content service data 524, routing list data 526, CDN data 527 and application and device characteristics data 528), and one or more application programs.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 556 and/or another network (not shown). The computer architecture 500 may connect to the network 556 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, game controller, television remote or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different examples of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such examples, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

FIG. 6 depicts an illustrative distributed computing environment 600 capable of executing the software components described herein for content transmission management. Thus, the distributed computing environment 600 illustrated in FIG. 6 can be utilized to execute many aspects of the software components presented herein. For example, the distributed computing environment 600 can be utilized to execute one or more aspects of the software components described herein.

According to various examples, the distributed computing environment 600 includes a computing environment 602 operating on, in communication with, or as part of the network 604. The network 604 may be or may include the network 556, described above. The network 604 also can include various access networks. One or more client devices 606A-806N (hereinafter referred to collectively and/or generically as "clients 606") can communicate with the computing environment 602 via the network 604 and/or other connections (not illustrated in FIG. 6). In one illustrated configuration, the clients 606 include a computing device 606A, such as a laptop computer, a desktop computer, or other computing device; a slate or tablet computing device ("tablet computing device") 606B; a mobile computing device 606C such as a mobile telephone, a smart phone, an on-board computer, or other mobile computing device; a server computer 606D; and/or other devices 606N, which can include a hardware security module. It should be understood that any number of devices 606 can communicate with the computing environment 602. Two example computing architectures for the devices 606 are illustrated and described herein with reference to FIGS. 5 and 7. It should be understood that the illustrated devices 606 and computing architectures illustrated and described herein are illustrative only and should not be construed as being limited in any way.

In the illustrated configuration, the computing environment 602 includes application servers 608, data storage 610, and one or more network interfaces 612. According to various examples, the functionality of the application servers 608 can be provided by one or more server computers that are executing as part of, or in communication with, the network 604. The application servers 608 can host various services, virtual machines, portals, and/or other resources. In the illustrated configuration, the application servers 608 host one or more virtual machines 614 for hosting applications or other functionality. According to various examples, the virtual machines 614 host one or more applications and/or software modules for content transmission management. It should be understood that this configuration is illustrative only and should not be construed as being limiting in any way.

According to various examples, the application servers 608 also include one or more communication services 620, content shaping services 622, and security and privacy services 624. The communication services 620 can include services for establishing the VPN tunnel and protocol handling for communications through the CORA service. The content shaping services 622 can include services for transcoding data and managing a transmission rate to improve efficiency in network usage. The security and privacy services 624 can include services for encrypting and decrypting communications, maintaining certificates, and anonymizing devices and data.

As shown in FIG. 6, the application servers 608 also can host other services, applications, portals, and/or other resources ("other resources") 628. The other resources 628 can include, but are not limited to, data encryption, data sharing, or any other functionality.

As mentioned above, the computing environment 602 can include data storage 610. According to various examples, the functionality of the data storage 610 is provided by one or more databases or data stores operating on, or in communication with, the network 604. The functionality of the data storage 610 also can be provided by one or more server computers configured to host data for the computing environment 602. The data storage 610 can include, host, or provide one or more real or virtual data stores 626A-826N (hereinafter referred to collectively and/or generically as "datastores 626"). The datastores 626 are configured to host data used or created by the application servers 608 and/or other data. Aspects of the datastores 626 may be associated with services for content transmission management. Although not illustrated in FIG. 6, the datastores 626 also can host or store web page documents, word documents, presentation documents, data structures, algorithms for execution by a recommendation engine, and/or other data utilized by any application program or another module.

The computing environment 602 can communicate with, or be accessed by, the network interfaces 612. The network interfaces 612 can include various types of network hardware and software for supporting communications between two or more computing devices including, but not limited to, mobile client vehicles, the clients 606 and the application servers 608. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein.

According to various examples of the concepts and technologies disclosed herein, the distributed computing environment 600 may provide the software functionality described herein as a service to the clients using devices 606. It should be understood that the devices 606 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 600 to utilize the functionality described herein for content transmission management, among other aspects.

Figure 7:
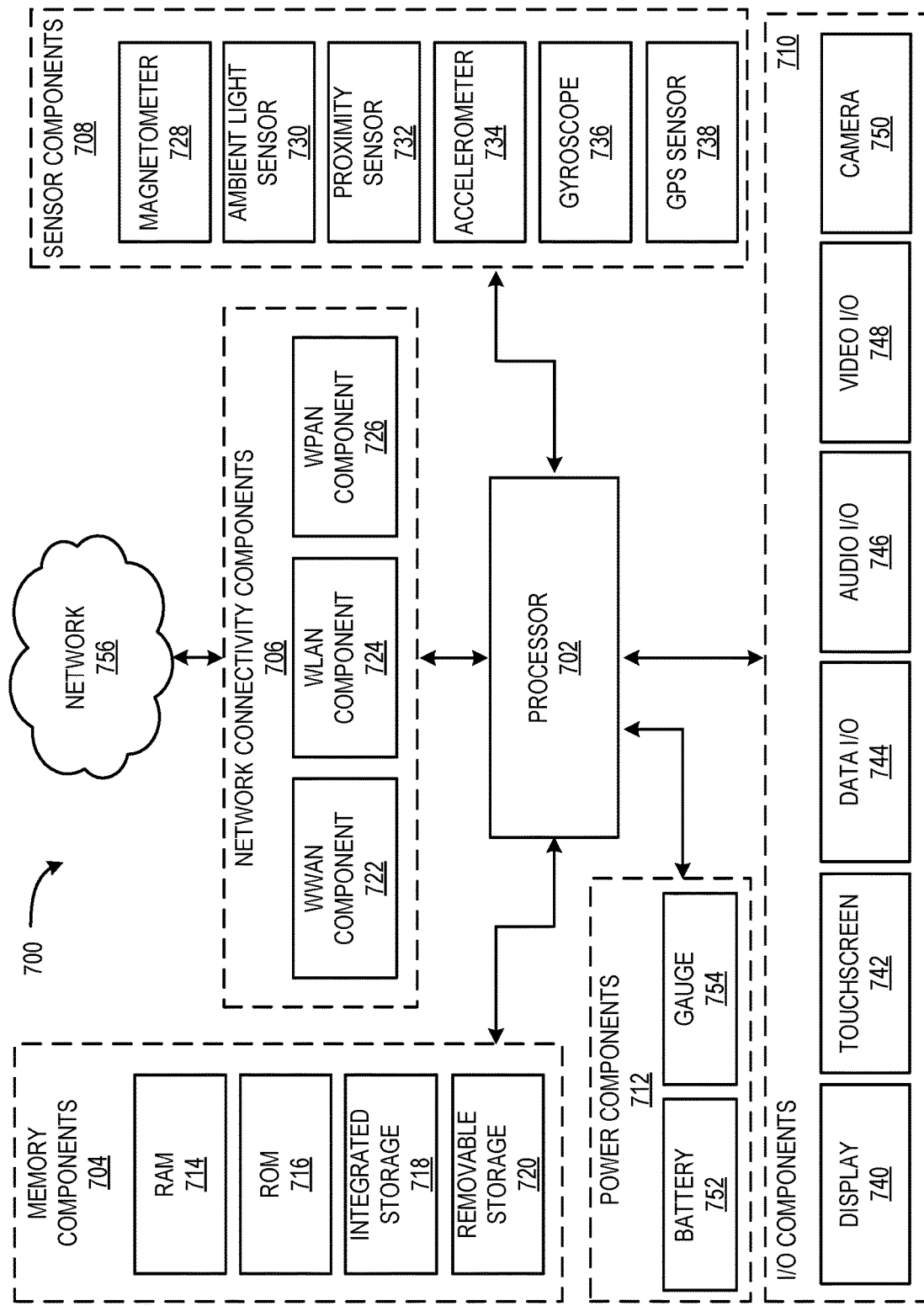
FIG. 7 is a computer architecture diagram illustrating a computing device architecture for a computing device capable of implementing aspects of the techniques and technologies presented herein.

Turning now to FIG. 7, an illustrative computing device architecture 700 for a computing device that is capable of executing various software components is described herein for content transmission management. The computing device architecture 700 is applicable to computing devices such as mobile clients in vehicles. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 700 is applicable to the mobile devices, CORA service and content services in the discussion above.

The computing device architecture 700 illustrated in FIG. 7 includes a processor 702, memory components 704, network connectivity components 706, sensor components 708, input/output components 710, and power components 712. In the illustrated configuration, the processor 702 is in communication with the memory components 704, the network connectivity components 706, the sensor components 708, the input/output ("I/O") components 710, and the power components 712. Although no connections are shown between the individual components illustrated in FIG. 7, the components can interact to carry out device functions. In some configurations, the components are arranged so as to communicate via one or more busses (not shown).

The processor 702 includes a central processing unit ("CPU") configured to process data, execute computer-executable instructions of one or more application programs, and communicate with other components of the computing device architecture 700 in order to perform various functionality described herein. The processor 702 may be utilized to execute aspects of the software components presented herein and, particularly, those that utilize, at least in part, secure data.

In some configurations, the processor 702 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620P, 1080P, and higher resolution), video games, three-dimensional ("3D") modeling applications, and the like. In some configurations, the processor 702 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 702 is, or is included in, a system-on-chip ("SoC") along with one or more of the other components described herein below. For example, the SoC may include the processor 702, a GPU, one or more of the network connectivity components 706, and one or more of the sensor components 708. In some configurations, the processor 702 is fabricated, in part, utilizing a package-on-package ("PoP") integrated circuit packaging technique. The processor 702 may be a single core or multi-core processor.

The processor 702 may be created in accordance with an ARM architecture, available for license from ARM HOLDINGS of Cambridge, United Kingdom. Alternatively, the processor 702 may be created in accordance with an x86 architecture, such as is available from INTEL CORPORATION of Mountain View, California and others. In some configurations, the processor 702 is a SNAPDRAGON SoC, available from QUALCOMM of San Diego, California, a TEGRA SoC, available from NVIDIA of Santa Clara, California, a HUMMINGBIRD SoC, available from SAMSUNG of Seoul, South Korea, an Open Multimedia Application Platform ("OMAP") SoC, available from TEXAS INSTRUMENTS of Dallas, Texas, a customized version of any of the above SoCs, or a proprietary SoC.

The memory components 704 include a random access memory ("RAM") 714, a read-only memory ("ROM") 716, an integrated storage memory ("integrated storage") 718, and a removable storage memory ("removable storage") 720. In some configurations, the RAM 714 or a portion thereof, the ROM 716 or a portion thereof, and/or some combination of the RAM 714 and the ROM 716 is integrated in the processor 702. In some configurations, the ROM 716 is configured to store a firmware, an operating system or a portion thereof (e.g., operating system kernel), and/or a bootloader to load an operating system kernel from the integrated storage 718 and/or the removable storage 720.

The integrated storage 718 can include a solid-state memory, a hard disk, or a combination of solid-state memory and a hard disk. The integrated storage 718 may be soldered or otherwise connected to a logic board upon which the processor 702 and other components described herein also may be connected. As such, the integrated storage 718 is integrated in the computing device. The integrated storage 718 is configured to store an operating system or portions thereof, application programs, data, and other software components described herein.

The removable storage 720 can include a solid-state memory, a hard disk, or a combination of solid-state memory and a hard disk. In some configurations, the removable storage 720 is provided in lieu of the integrated storage 718. In other configurations, the removable storage 720 is provided as additional optional storage. In some configurations, the removable storage 720 is logically combined with the integrated storage 718 such that the total available storage is made available as a total combined storage capacity. In some configurations, the total combined capacity of the integrated storage 718 and the removable storage 720 is shown to a user instead of separate storage capacities for the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 can communicate with other components of the computing device, such as the processor 702. The removable storage 720 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSFT AZURE from Microsoft Corporation of Redmond, Washington or AWS from Amazon Corporation of Seattle, Washington The operating system may also include WINDOWS MOBILE OS from Microsoft Corporation of Redmond, Washington, WINDOWS PHONE OS from Microsoft Corporation, WINDOWS from Microsoft Corporation, MAC OS or IOS from Apple Inc. of Cupertino, California, and ANDROID OS from Google Inc. of Mountain View, California Other operating systems are contemplated.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from the network 756 or another network, which may be a WWAN, a WLAN, or a WPAN. Although only the network 756 is illustrated, the network connectivity components 706 may facilitate simultaneous communication with multiple networks, including the network 756 of FIG. 7. For example, the network connectivity components 706 may facilitate simultaneous communications with multiple networks via one or more of a WWAN, a WLAN, or a WPAN.

The network 756 may be or may include a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 756 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 756 may be configured to provide voice and/or data communications with any combination of the above technologies. The network 756 may be configured to or be adapted to provide voice and/or data communications in accordance with future generation technologies.

In some configurations, the WWAN component 722 is configured to provide dual-multi-mode connectivity to the network 756. For example, the WWAN component 722 may be configured to provide connectivity to the network 756, wherein the network 756 provides service via GSM and UMTS technologies, or via some other combination of technologies. Alternatively, multiple WWAN components 722 may be utilized to perform such functionality, and/or provide additional functionality to support other non-compatible technologies (i.e., incapable of being supported by a single WWAN component). The WWAN component 722 may facilitate similar connectivity to multiple networks (e.g., a UMTS network and an LTE network).

The network 756 may be a WLAN operating in accordance with one or more Institute of Electrical and Electronic Engineers ("IEEE") 602.11 standards, such as IEEE 602.11a, 602.11b, 602.11g, 602.11n, and/or future 602.11 standard (referred to herein collectively as WI-FI). Draft 602.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 724 is configured to connect to the network 756 via the WI-FI access points. Such connections may be secured via various encryption technologies including, but not limited to, WI-FI Protected Access ("WPA"), WPA2, Wired Equivalent Privacy ("WEP"), and the like.

The network 756 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 726 is configured to facilitate communications with other devices, such as peripherals, computers, or other computing devices via the WPAN.

The sensor components 708 include a magnetometer 728, an ambient light sensor 730, a proximity sensor 732, an accelerometer 734, a gyroscope 736, and a Global Positioning System sensor ("GPS sensor") 738. It is contemplated that other sensors, such as, but not limited to, temperature sensors or shock detection sensors, also may be incorporated in the computing device architecture 700.

The I/O components 710 include a display 740, a touchscreen 742, a data I/O interface component ("data I/O") 744, an audio I/O interface component ("audio I/O") 746, a video I/O interface component ("video I/O") 748, and a camera 750. In some configurations, the display 740 and the touchscreen 742 are combined. In some configurations two or more of the data I/O component 744, the audio I/O component 746, and the video I/O component 748 are combined. The I/O components 710 may include discrete processors configured to support the various interfaces described below or may include processing functionality built-in to the processor 702.

The illustrated power components 712 include one or more batteries 752, which can be connected to a battery gauge 754. The batteries 752 may be rechargeable or disposable. Rechargeable battery types include, but are not limited to, lithium polymer, lithium ion, nickel cadmium, and nickel metal hydride. Each of the batteries 752 may be made of one or more cells.

The power components 712 may also include a power connector, which may be combined with one or more of the aforementioned I/O components 710. The power components 712 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely intended to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements and configurations of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the invention.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The present disclosure is made in light of the following clauses:

Clause 1: A computer implemented content data transmission bandwidth management method, the method comprising: receiving content data directed toward a mobile device; transmitting the content data in a communication channel to the mobile device at an initial bit rate; and introducing a delay in the communication channel to activate an adaptive bit rate (ABR) capability in the mobile device.

Clause 2. The computer implemented method of Clause 1, the method including: receiving feedback pertaining to a status of content data consumption in the mobile device from a mobile client application on the mobile device; and adjusting the delay in the communication channel to increase or decrease the bit rate of the ABR capability in the mobile device responsive to the feedback.

Clause 3. The computer implemented method of Clause 1, the method including: determining an initial resolution of the content data during a trial period during the transmitting the content data to the mobile device at the initial bit rate; and the step of introducing a delay in the communication channel to activate an adaptive bit rate (ABR) capability in the mobile device comprises adjusting the delay in the communication channel to increase or decrease the bit rate of the ABR capability in the mobile device to a target bit rate.

Clause 4. The computer implemented method of Clause 1, the method including: determining one or more bandwidth reduction strategies for processing the content data; processing the content data according to the one or more determined bandwidth reduction strategies; and the step of transmitting the content data to the mobile device at an initial bit rate comprises transmitting the processed content data to the mobile device at an initial bit rate.

Clause 5. The computer implemented method of Clause 4, where the bandwidth reduction strategies for processing the content data include at least one of lossy resolution reduction, lossless resolution reduction, lossy transcoding, lossless transcoding, lossy compression and lossless compression.

Clause 6. The computer implemented method of Clause 4, where the step of determining one or more bandwidth reduction strategies for processing the content data comprises determining one or more bandwidth reduction strategies for processing the content data based on one or more characteristics of the mobile device.

Clause 7. The computer implemented method of Clause 4, where the step of transmitting the processed content data to the mobile device at an initial bit rate includes sending control information pertaining to the one or more determined bandwidth reduction strategies for reconstituting the processed content data.

Clause 8. A system for content data transmission bandwidth management, the system comprising: one or more processors; and one or more memory devices in communication with the one or more processors, the memory devices having computer-readable instructions stored thereupon that, when executed by the processors, cause the processors to perform a method for content data transmission bandwidth management, the method comprising: receiving content data directed toward a mobile device; transmitting the content data in a communication channel to the mobile device at an initial bit rate; and introducing a delay in the communication channel to activate an adaptive bit rate (ABR) capability in the mobile device.

Clause 9. The system of Clause 8, where the method includes: receiving feedback pertaining to a status of content data consumption in the mobile device from a mobile client application on the mobile device; and adjusting the delay in the communication channel to increase or decrease the bit rate of the ABR capability in the mobile device responsive to the feedback.

Clause 10. The system of Clause 8, where the method includes: determining an initial resolution of the content data during a trial period during the transmitting the content data to the mobile device at the initial bit rate; and the step of introducing a delay in the communication channel to activate an adaptive bit rate (ABR) capability in the mobile device comprises adjusting the delay in the communication channel to increase or decrease the bit rate of the ABR capability in the mobile device to a target bit rate.

Clause 11. The system of Clause 8, where the method includes: determining one or more bandwidth reduction strategies for processing the content data; processing the content data according to the one or more determined bandwidth reduction strategies; and the step of transmitting the content data to the mobile device at an initial bit rate comprises transmitting the processed content data to the mobile device at an initial bit rate.

Clause 12. The system of Clause 11, where the method includes where the bandwidth reduction strategies for processing the content data include at least one of lossy resolution reduction, lossless resolution reduction, lossy transcoding, lossless transcoding, lossy compression and lossless compression.

Clause 13. The system of Clause 11, where the step of determining one or more bandwidth reduction strategies for processing the content data comprises determining one or more bandwidth reduction strategies for processing the content data based on one or more characteristics of the mobile device.

Clause 14. The system of Clause 11, where the step of transmitting the processed content data to the mobile device at an initial bit rate includes sending control information pertaining to the one or more determined bandwidth reduction strategies for reconstituting the processed content data.

Clause 15. One or more computer readable media having computer executable instructions stored thereon which, when executed by one or more processors, cause the processors to execute a method for content data transmission bandwidth management, the method comprising: receiving content data directed toward a mobile device; transmitting the content data in a communication channel to the mobile device at an initial bit rate; and introducing a delay in the communication channel to activate an adaptive bit rate (ABR) capability in the mobile device.

Clause 16. The computer readable media of Clause 15, where the method includes: receiving feedback pertaining to a status of content data consumption in the mobile device from a mobile client application on the mobile device; and adjusting the delay in the communication channel to increase or decrease the bit rate of the ABR capability in the mobile device responsive to the feedback.

Clause 17. The computer readable media of Clause 15, where the method includes: determining an initial resolution of the content data during a trial period during the transmitting the content data to the mobile device at the initial bit rate; and the step of introducing a delay in the communication channel to activate an adaptive bit rate (ABR) capability in the mobile device comprises adjusting the delay in the communication channel to increase or decrease the bit rate of the ABR capability in the mobile device to a target bit rate.

Clause 18. The computer readable media of Clause 15, where the method includes: determining one or more bandwidth reduction strategies for processing the content data; processing the content data according to the one or more determined bandwidth reduction strategies; and the step of transmitting the content data to the mobile device at an initial bit rate comprises transmitting the processed content data to the mobile device at an initial bit rate.

Clause 19. The computer readable media of Clause 18, where the method includes where the bandwidth reduction strategies for processing the content data include at least one of lossy resolution reduction, lossless resolution reduction, lossy transcoding, lossless transcoding, lossy compression and lossless compression.

Clause 20. The computer readable media of Clause 18, where the step of determining one or more bandwidth reduction strategies for processing the content data comprises determining one or more bandwidth reduction strategies for processing the content data based on one or more characteristics of the mobile device.

Clause 21. The computer readable media of Clause 18, where the step of transmitting the processed content data to the mobile device at an initial bit rate includes sending control information pertaining to the one or more determined bandwidth reduction strategies for reconstituting the processed content data.

I claim:

1. A computer implemented content data transmission bandwidth management method, the method comprising:
receiving content data directed toward a mobile device;
transmitting the content data in a communication channel to the mobile device at an initial bit rate; and
introducing a delay in the communication channel to activate an adaptive bit rate (ABR) capability in the mobile device to adjust the bit rate to a target bit rate.

2. The computer implemented method of claim 1, the method including:
receiving feedback pertaining to a status of content data consumption in the mobile device from a mobile client application on the mobile device; and
adjusting the delay in the communication channel to increase or decrease the bit rate of the ABR capability in the mobile device responsive to the feedback.

3. The computer implemented method of claim 1, the method including:
determining an initial resolution of the content data during a trial period during the transmitting the content data to the mobile device at the initial bit rate; and
the step of introducing a delay in the communication channel to activate an adaptive bit rate (ABR) capability in the mobile device to adjust the bit rate to a target bit rate comprises adjusting the delay in the communication channel to increase or decrease the bit rate of the ABR capability in the mobile device to achieve a target resolution.

4. The computer implemented method of claim 1, the method including:
determining one or more bandwidth reduction strategies for processing the content data;
processing the content data according to the one or more determined bandwidth reduction strategies; and
the step of transmitting the content data to the mobile device at an initial bit rate comprises transmitting the processed content data to the mobile device at an initial bit rate.

5. The computer implemented method of claim 4, where the bandwidth reduction strategies for processing the content data include at least one of lossy resolution reduction, lossless resolution reduction, lossy transcoding, lossless transcoding, lossy compression and lossless compression.

6. The computer implemented method of claim 4, where the step of determining one or more bandwidth reduction strategies for processing the content data comprises determining one or more bandwidth reduction strategies for processing the content data based on one or more characteristics of the mobile device.

7. The computer implemented method of claim 4, where the step of transmitting the processed content data to the mobile device at an initial bit rate includes sending control information pertaining to the one or more determined bandwidth reduction strategies for reconstituting the processed content data.

8. A system for content data transmission bandwidth management, the system comprising:
one or more processors; and
one or more memory devices in communication with the one or more processors, the memory devices having computer-readable instructions stored thereupon that, when executed by the processors, cause the processors to perform a method for content data transmission bandwidth management, the method comprising:
receiving content data directed toward a mobile device;
transmitting the content data in a communication channel to the mobile device at an initial bit rate; and
introducing a delay in the communication channel to activate an adaptive bit rate (ABR) capability in the mobile device to adjust the bit rate to a target bit rate.

9. The system of claim 8, where the method includes:
receiving feedback pertaining to a status of content data consumption in the mobile device from a mobile client application on the mobile device; and
adjusting the delay in the communication channel to increase or decrease the bit rate of the ABR capability in the mobile device responsive to the feedback.

10. The system of claim 8, where the method includes:
determining an initial resolution of the content data during a trial period during the transmitting the content data to the mobile device at the initial bit rate; and
the step of introducing a delay in the communication channel to activate an adaptive bit rate (ABR) capability in the mobile device to adjust the bit rate to a target bit rate comprises adjusting the delay in the communication channel to increase or decrease the bit rate of the ABR capability in the mobile device to achieve a target resolution.

11. The system of claim 8, where the method includes:
determining one or more bandwidth reduction strategies for processing the content data;
processing the content data according to the one or more determined bandwidth reduction strategies; and
the step of transmitting the content data to the mobile device at an initial bit rate comprises transmitting the processed content data to the mobile device at an initial bit rate.

12. The system of claim 11, where the method includes where the bandwidth reduction strategies for processing the content data include at least one of lossy resolution reduction, lossless resolution reduction, lossy transcoding, lossless transcoding, lossy compression and lossless compression.

13. The system of claim 11, where the step of determining one or more bandwidth reduction strategies for processing the content data comprises determining one or more bandwidth reduction strategies for processing the content data based on one or more characteristics of the mobile device.

14. The system of claim 11, where the step of transmitting the processed content data to the mobile device at an initial bit rate includes sending control information pertaining to the one or more determined bandwidth reduction strategies for reconstituting the processed content data.

15. One or more non-transitory computer readable media having computer executable instructions stored thereon which, when executed by one or more processors, cause the processors to execute a method for content data transmission bandwidth management, the method comprising:
- receiving content data directed toward a mobile device;
- transmitting the content data in a communication channel to the mobile device at an initial bit rate; and
- introducing a delay in the communication channel to activate an adaptive bit rate (ABR) capability in the mobile device to adjust the bit rate to a target bit rate.

16. The computer readable media of claim 15, where the method includes:
- receiving feedback pertaining to a status of content data consumption in the mobile device from a mobile client application on the mobile device; and
- adjusting the delay in the communication channel to increase or decrease the bit rate of the ABR capability in the mobile device responsive to the feedback.

17. The computer readable media of claim 15, where the method includes:
- determining an initial resolution of the content data during a trial period during the transmitting the content data to the mobile device at the initial bit rate; and
- the step of introducing a delay in the communication channel to activate an adaptive bit rate (ABR) capability in the mobile device to adjust the bit rate to a target bit rate comprises adjusting the delay in the communication channel to increase or decrease the bit rate of the ABR capability in the mobile device to achieve a target resolution.

18. The computer readable media of claim 15, where the method includes:
- determining one or more bandwidth reduction strategies for processing the content data;
- processing the content data according to the one or more determined bandwidth reduction strategies; and
- the step of transmitting the content data to the mobile device at an initial bit rate comprises transmitting the processed content data to the mobile device at an initial bit rate.

19. The computer readable media of claim 18, where the method includes where the bandwidth reduction strategies for processing the content data include at least one of lossy resolution reduction, lossless resolution reduction, lossy transcoding, lossless transcoding, lossy compression and lossless compression.

20. The computer readable media of claim 18, where the step of determining one or more bandwidth reduction strategies for processing the content data comprises determining one or more bandwidth reduction strategies for processing the content data based on one or more characteristics of the mobile device.

* * * * *